United States Patent
Li et al.

(10) Patent No.: US 12,425,174 B2
(45) Date of Patent: Sep. 23, 2025

(54) CHANNEL PROCESSING METHOD, APPARATUS, DEVICE AND STORAGE MEDIUM

(71) Applicant: GUANGDONG OPPO MOBILE TELECOMMUNICATIONS CORP., LTD., Guangdong (CN)

(72) Inventors: Haitao Li, Dongguan (CN); Xin You, Dongguan (CN); Zhe Fu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 581 days.

(21) Appl. No.: 17/880,737

(22) Filed: Aug. 4, 2022

(65) Prior Publication Data

US 2022/0376879 A1  Nov. 24, 2022

Related U.S. Application Data

(63) Continuation of application No. PCT/CN2020/074507, filed on Feb. 7, 2020.

(51) Int. Cl.
*H04L 5/00* (2006.01)
*H04L 1/1812* (2023.01)

(52) U.S. Cl.
CPC .......... *H04L 5/0092* (2013.01); *H04L 1/1812* (2013.01); *H04L 5/0064* (2013.01)

(58) Field of Classification Search
CPC .... H04L 5/0092; H04L 5/0064; H04L 1/1812
See application file for complete search history.

(56) References Cited

U.S. PATENT DOCUMENTS

2010/0281322 A1  11/2010  Park et al.
2012/0057547 A1   3/2012  Lohr
(Continued)

FOREIGN PATENT DOCUMENTS

CN    101631333 A    1/2010
CN    104303578 A    1/2015
(Continued)

OTHER PUBLICATIONS

First Examination Report for Indian Application No. 202217044965 Issued Oct. 16, 2023, 6 Pages.
(Continued)

*Primary Examiner* — Elton Williams
(74) *Attorney, Agent, or Firm* — PERKINS COIE LLP

(57) ABSTRACT

Provided in the implementations of the present disclosure are a channel processing method and an apparatus, and a device and a storage medium, the method includes: acquiring an uplink transmission resource and an identifier for a HARQ process used for transmitting data on the uplink transmission resource, and then on the basis of a HARQ feedback function state of the HARQ process and a HARQ feedback function property for each logical channel, determining a candidate logical channel set multiplexed on the uplink transmission resource. Thus, a terminal device is able to select, on the basis of QoS requirements held by different services, multiplexed candidate logical channels for performing data transmission, thereby satisfying requirements for transmission time lag and/or reliability, improving service experience for a user.

14 Claims, 6 Drawing Sheets

(56) References Cited

U.S. PATENT DOCUMENTS

| 2015/0009936 | A1 | 1/2015 | Quan et al. | |
|---|---|---|---|---|
| 2017/0318594 | A1 | 11/2017 | Babaei | |
| 2022/0158770 | A1* | 5/2022 | Hong | H04L 5/0091 |
| 2022/0224447 | A1* | 7/2022 | Seidel | H04L 1/1887 |

FOREIGN PATENT DOCUMENTS

| CN | 106330410 A | 1/2017 |
|---|---|---|
| CN | 107197520 A | 9/2017 |
| CN | 108811127 A | 11/2018 |
| CN | 110708145 A | 1/2020 |

OTHER PUBLICATIONS

Notice of Reasons for Refusal for Japanese Application No. 2022-547165 Issued Oct. 27, 2023, 6 Pages with English translation.
CMCC, Huawei, HiSilicon, Sony, KT Corp., NEC, Nomor, Further consideration on HARQ configuration in NTN, 3GPP TSG RAN WG2 Meeting107bis, Chongqing, Oct. 14-18, 2019, R2-1914197.
Huawei, HiSilicon, Token accumulation for LCP, 3GPP TSG RAN WG2 #98, Hangzhou, China, May 15-19, 2017, R2-1704954.
Suciu, Radu. European Application No. 20918064 Search Report Mailed Dec. 22, 20222, pp. 1-7.
Written Opinion Mailed Oct. 28, 2020 in Application No. PCT/CN2020/074507, 8 pages.
International Search Report Mailed Oct. 28, 2020 in Application No. PCT/CN2020/074507, 4 pages.
Ericsson, Support of HARQ procedure over sidelink, 3GPP TSG-RAN WG2 #107bis, R2-1913327, Chongqing, China, Oct. 14-18, 2019, 10 pages.
Nokia, Nokia Shanghai Bell, Discussion on LCP procedure for NTN, 3GPP TSG-RAN WG2 Meeting #107bis, R2-1913388, Chongqing, China, Oct. 14-18, 2019, 5 pages.
3GPP TR 38.821 V1.0.0 (Dec. 2019), 3rd Generation Partnership Project; Technical Specification Group Radio Access Network; Solutions for NR to support non-terrestrial networks (NTN), 143 pages.
The First Office Action for Chinese Application No. 202310041829.5 issued Jun. 13, 2024. 11 pages with English translation.
Notice of Allowance for Chinese Application No. 202310041829.5 issued Aug. 22, 2024. 6 pages with English translation.

* cited by examiner

CHANNEL PROCESSING METHOD, APPARATUS, DEVICE AND STORAGE MEDIUM

CROSS-REFERENCE TO RELATED APPLICATION

The present application is a continuation application of International PCT Application No. PCT/CN2020/074507, filed on Feb. 7, 2020, the entire content of which is hereby incorporated by reference.

TECHNICAL FIELD

Implementations of the present disclosure relate to the field of communication technologies, and more particularly, to a channel processing method and apparatus, a device, and a storage medium.

BACKGROUND

In a non-terrestrial network (NTN) system, with regards to the characteristic that the signal propagation delay between a terminal device and a satellite increases greatly, the way to disable a hybrid automatic repeat request (HARQ) function has been developed to reduce the data transmission delay.

At present, in a downlink transmission process, in order to meet the quality of service (QoS) requirements of different services, a network device can allocate logical channels with different QoS requirements to different HARQ processes for transmission according to the QoS requirements of the logical channels upon scheduling. In an uplink transmission process, the network device allocates uplink transmission resources based on the terminal device, and which logical channels are multiplexed on the allocated uplink transmission resources for transmitting data is determined by the terminal device. Specifically, the terminal device performs multiplexing of the logical channels based on a logical channel priority, a prioritized bit rate, a token bucket depth, etc.

However, for an HARQ process in which an HARQ feedback function is disabled and an HARQ process in which the HARQ feedback function is enabled, there is no set of rules at present yet to stipulate how to complete multiplexing of uplink logical channels, that is, the terminal device does not consider the QoS requirements of different services in the uplink transmission process, and the requirements on transmission delay and/or reliability may not be met.

SUMMARY

Implementations of the present disclosure provide a channel processing method and apparatus, a device, and a storage medium, so as to solve the problem that the requirements on transmission delay and/or reliability may not be met because the QoS requirements of different services are not considered by a terminal device in an uplink transmission process.

In a first aspect, an implementation of the present disclosure provides a method for channel processing, which includes:
acquiring first information, wherein the first information includes uplink transmission resources and an identifier of an HARQ process used for transmitting data on the uplink transmission resources; and
determining a set of candidate logical channels multiplexed on the uplink transmission resources according to an HARQ feedback function state of the HARQ process and an HARQ feedback function attribute of each logical channel.

In a second aspect, the present disclosure provides a method for channel processing, which includes:
determining configuration information for a terminal device, wherein the configuration information includes first configuration information for each uplink logical channel and second configuration information for uplink HARQ processes; and
transmitting the configuration information to the terminal device,
wherein the first configuration information includes a logical channel priority, a prioritized bit rate, a token bucket size duration, and an HARQ feedback function attribute; and
the second configuration information includes a number of uplink HARQ processes and an HARQ feedback function state of each HARQ process.

In a third aspect, the present disclosure provides an apparatus for channel processing including an acquiring module and a processing module;
the acquiring module is configured to acquire first information, wherein the first information includes uplink transmission resources and an identifier of an HARQ process used for transmitting data on the uplink transmission resources; and
the processing module is configured to determine a set of candidate logical channels multiplexed on the uplink transmission resources according to an HARQ feedback function state of the HARQ process and an HARQ feedback function attribute of each logical channel.

In a fourth aspect, the present disclosure provides an apparatus for channel processing including a determining module and a transmitting module;
the determining module is configured to determine configuration information for a terminal device, wherein the configuration information includes first configuration information for each uplink logical channel and second configuration information for uplink HARQ processes; and
the transmitting module is configured to transmit the configuration information to a terminal device,
wherein the first configuration information includes a logical channel priority, a prioritized bit rate, a token bucket size duration, and an HARQ feedback function attribute; and
the second configuration information includes a number of uplink HARQ processes and an HARQ feedback function state of each HARQ process.

In a fifth aspect, an implementation of the present disclosure further provides a terminal device including: a processor, a memory, a receiver, and an interface for communicating with a network device; the memory stores computer executable instructions; and the processor executes the computer executable instructions stored in the memory to enable the processor to perform the method as described in the first aspect.

Optionally, the processor may be a chip.

In a sixth aspect, an implementation of the present disclosure provides a network device including: a processor, a memory, a transmitter, and an interface for communicating with a terminal device; the memory stores computer executable instructions; and the processor executes the computer executable instructions stored in the memory to enable the processor to perform the method as described in the second aspect.

Optionally, the processor may be a chip.

In a seventh aspect, an implementation of the present disclosure further provides a computer-readable storage medium having computer executable instructions stored thereon, which, when executed by a processor, are used for implementing the method described in the first aspect.

In an eighth aspect, an implementation of the present disclosure further provides a computer-readable storage medium having computer executable instructions stored thereon, which, when executed by a processor, are used for implementing the method described in the second aspect.

In a ninth aspect, an implementation of the present disclosure provides a program, which, when executed by a processor, is used for performing the method as described in the first aspect.

In a tenth aspect, an implementation of the present disclosure provides a program, which, when executed by a processor, is used for performing the method as described in the second aspect.

In an eleventh aspect, an implementation of the present disclosure provides a computer program product including program instructions, which are used for implementing the method as described in the first aspect.

In a twelfth aspect, an implementation of the present disclosure provides a computer program product including program instructions, which are used for implementing the method as described in the second aspect.

In a thirteenth aspect, an implementation of the present disclosure provides a chip including a processing module capable of performing the method described in the first aspect and a communication interface.

Further, the chip also includes a storage module (e.g., a memory) used for storing instructions, the processing module is used for executing the instructions stored in the storage module, and the execution of the instructions stored in the storage module enables the processing module to perform the method described in the first aspect.

In a fourteenth aspect, an implementation of the present disclosure provides a chip including a processing module capable of performing the method described in the second aspect and a communication interface.

Further, the chip also includes a storage module (e.g., a memory) used for storing instructions, the processing module is used for executing the instructions stored in the storage module, and the execution of the instructions stored in the storage module enables the processing module to perform the method described in the second aspect.

In a fifteenth aspect, the present disclosure provides a communication system including a network device and a terminal device; the terminal device is the apparatus described in the third aspect, and the network device is the apparatus described in the fourth aspect.

In the channel processing method and apparatus, the device and the storage medium provided by the implementations of the present disclosure, the uplink transmission resources and the identifier of the HARQ process used for transmitting data on the uplink transmission resources are acquired, and then the set of candidate logical channels multiplexed on the uplink transmission resources is determined according to the HARQ feedback function state of the HARQ process and the HARQ feedback function attribute of each logical channel. In such a manner, the terminal device can select the multiplexed candidate logical channels to perform data transmission based on the QoS requirements of different services, thereby satisfying the requirements on transmission delay and/or reliability and improving the service experience of users.

DETAILED DESCRIPTION

Figure 1:
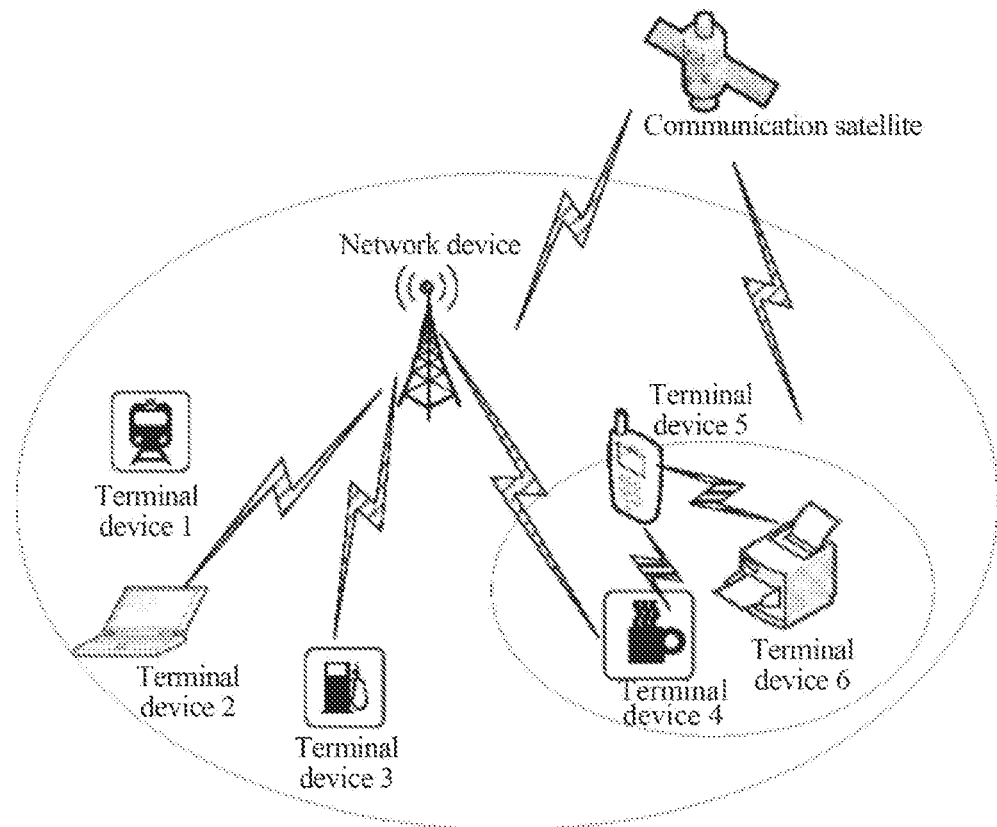
FIG. 1 is a schematic structure diagram of a communications system in accordance with an implementation of the present disclosure.

In order to make the objects, technical solutions and advantages of the implementations of the present disclosure more clear, the technical solutions in the implementations of the present disclosure will be described clearly and completely in combination with the drawings in the implementations of the present disclosure. It is apparent that the described implementations are only parts, but not all of the implementations of the present disclosure. Based on the implementations of the present disclosure, all other implementations achieved by a person of ordinary skill in the art without making inventive efforts are within the protection scope of the present disclosure.

The terms "first", "second", and the like in the specification, claims and drawings of the implementations of the present disclosure are intended to distinguish different objects but not intended to describe a specific order or precedence order. It should be understood that data thus used can be interchanged where appropriate, so that the implementations of the present disclosure described herein can be implemented in an order other than that illustrated or described herein. In addition, the terms "include", "have" and any variations thereof are intended to cover non-exclusive inclusion, for example, processes, methods, systems, products or devices that include a series of acts or units are not necessarily limited to those acts or units dearly listed, but may include other acts or units that are not clearly listed or inherent to these processes, methods, products or devices.

At the present stage, the technology of non-terrestrial network (NTN) is being studied in the 3rd Generation Partnership Project (3GPP). Generally, communication services are provided to ground users by means of satellite communication in the NTN. Satellite communication refers to communication between two or more earth stations performed by forwarding or reflecting radio waves using artificial earth satellites as relay stations.

Compared with terrestrial cellular network communication, satellite communication has many unique advantages. Firstly, satellite communication is not limited by user regions. For example, general terrestrial communication cannot cover areas such as oceans, mountains, deserts, etc., where communication devices cannot be set up or communication coverage is not completed due to under-population, while for satellite communication, because a satellite can cover a larger ground and the satellite can orbit around the earth, theoretically every corner of the earth can be covered by satellite communication. Secondly, satellite communication has great social value. Satellite communication can cover remote mountainous areas and poor and backward countries or regions at a lower cost, so that people in these regions can enjoy advanced voice communication and mobile Internet technology, which is conducive to narrowing the digital divide with developed regions and promoting the development of these regions. Thirdly, the distance of satellite communication is long, and the increased communication cost due to the increased communication distance is not significant. Finally, the stability of satellite communication is high and will not be limited by natural disasters.

Therefore, in the NTN, by deploying base stations or partial base station functions on high-altitude platforms or satellites to provide seamless coverage for terminal devices, and because the high-altitude platforms or satellites is less affected by natural disasters, the reliability of 5G systems can be improved.

An architectural schematic diagram of a communication system, to which the implementations of the present disclosure are applicable, will be briefly introduced first.

FIG. 1 is a schematic structure diagram of a communications system in accordance with an implementation of the present disclosure. As shown in FIG. 1, a network device and terminal devices 1 to 6 may form a communication system, in which any of the terminal devices 1 to 6 may transmit uplink data to the network device or receive downlink data transmitted by the network device. In addition, the terminal devices 4 to 6 may form a communication system, in which the terminal device 4 or 6 may transmit uplink data to the terminal device 5 or receive downlink data transmitted by the terminal device 5.

Exemplarily, the communication system shown in FIG. 1 may further include a communication satellite which may serve as a transfer station between at least one of the terminal devices 1 to 6 and the network device, to provide services for the terminal devices 1 to 6.

In an implementation of the present disclosure, the terminal device may be any one of the terminal devices 1 to 6, and the network device may be a base station providing services for the terminal devices 1 to 6, or may be a communication satellite serving as a transfer station between the terminal devices 1 to 6 and the network device.

Optionally, the communication system may include a plurality of network devices, and other numbers of terminal devices may be included within the coverage area of each of the network devices. The numbers of network devices and terminal devices included in the communication system are not limited in the implementations of the present disclosure.

Optionally, the terminal devices can be connected to the network device wirelessly. For example, wireless communication between the network device and a plurality of terminal devices may be established using an unlicensed spectrum. Optionally, device to device (D2D) communication may be established between the terminal devices.

It can be understood that FIG. 1 is only a schematic diagram, and other network devices such as core network devices, wireless relay devices and wireless backhaul devices or other network entities such as network controllers, mobility management entities, etc., may also be included in the communication system, the implementations of the present disclosure are not limited thereto.

The technical solutions of the implementations of the present disclosure may be applied to various communication systems, such as a global system of mobile communication (GSM) system, a code division multiple access (CDMA) system, a wideband code division multiple access (WCDMA) system, a general packet radio service (GPRS), a long term evolution (LTE) system, a LTE frequency division duplex (FDD) system, a LTE time division duplex (TDD) system, an advanced long term evolution (LTE-A) system, a new radio (NR) system, an evolution system of an NR system, a LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, wireless local area networks (WLANs), wireless fidelity (WiFi), a next generation communication system or other communication systems.

Generally speaking, the number of connections supported by traditional communication systems is limited, and the connections are easy to implement. However, with the development of communication technology, mobile communication systems will support not only traditional communication, but also, for example, device to device (D2D) communication, machine to machine (M2M) communication, machine type communication (MTC) or vehicle to vehicle (V2V) communication. The implementations of the present disclosure may also be applied to these communication systems.

System architectures and service scenarios described in the implementations of the present disclosure are intended to illustrate the technical solutions of the implementations of the present disclosure more clearly, but do not constitute a limitation to the technical solutions provided by the implementations of the present disclosure. Those of ordinary skilled in the art may know that with evolvement of network architectures and emergence of new service scenarios, the technical solutions provided by the implementations of the present disclosure are also applicable to similar technical problems.

The network device involved in the implementations of the present disclosure may be an ordinary base station (e.g., a NodeB, or an eNB, or a gNB), a new radio controller (an NR controller), a centralized unit, a new radio base station, a radio remote unit, a micro base station, a relay, a distributed unit, a transmission reception point (TRP), a transmission point (TP), or any other device. Specific technologies and specific device forms used by the network device are not limited in the implementations of the present disclosure. For convenience of description, in all the implementations of the present disclosure, the above-mentioned apparatuses for providing wireless communication functions for the terminal devices are collectively referred to as network devices.

In the implementations of the present disclosure, the terminal devices may be any terminals, for example, the terminal devices may be user equipment for machine type communication. That is to say, the terminal devices may also be referred to as user equipment (UE), mobile stations (MSs), mobile terminals, terminals, etc. The terminal devices may communicate with one or more core networks via a radio access network (RAN). For example, the terminal devices may be mobile phones (or be referred to as "cellular" phones), computers with mobile terminals, etc. For example, the terminal devices may also be portable, pocket-size, handheld, computer-built or vehicle-mounted mobile devices, and exchange speech and/or data with wireless access networks, which is not specifically limited in the implementations of the present disclosure.

Optionally, the network device and the terminal devices may be deployed on land, including indoors or outdoors, handheld or vehicle-mounted; or may be deployed on a water surface; or may be deployed on a plane, a balloon or an artificial satellite in the air. Application scenarios of the network device and the terminal devices are not limited in the implementations of the present disclosure.

Optionally, communications between the network device and the terminal devices and between the terminal devices may be established through a licensed spectrum, or an unlicensed spectrum, or both. Communications between the network device and the terminal devices and between the terminal devices may be established through a spectrum below 7 gigahertz (GHz), or a spectrum above 7 GHz, or both. Spectrum resources used between the network device and the terminal devices are not limited in the implementations of the present disclosure.

Communication satellites, hybrid automatic repeat request (HARQ) mechanisms in 5G NR, and radio link control (RLC) segmentation and data reorganization in 5G NR, which may be involved in the present disclosure, will be introduced below first.

Communication Satellites:

In satellite applications, the communication satellites can be divided into geostationary earth orbit (GEO) satellites and non-geostationary earth orbit (Non-GEO) satellites according to orbital altitudes where the communication satellites providing services are located. The non-GEO satellites can be further divided into low earth orbit (LEO) satellites, medium-earth orbit (MEO) satellites and high elliptical orbit (HEO) satellites. The LEO satellites and GEO satellites have become the main research objects in the field of global communication because of their low orbital altitudes and small propagation delays.

The orbital altitude of a LEO satellite ranges from 500 km to 1500 km, and its orbit period is about 1.5 hours to 2 hours. The signal propagation delay of single-hop communication between the terminal device and the LEO is usually less than 20 ms, and the maximum satellite visual time is 20 minutes. That is to say, the signal propagation distance between the terminal device and the LEO is short, the link loss is little, and the requirement on transmitting power of the terminal device is not high.

The orbital altitude of a GEO satellite is 35786 km, and its rotation period around the earth is 24 hours. The signal propagation delay of single-hop communication between the terminal device and the LEO is generally 250 ms.

Usually, in order to ensure the satellites' coverage area and improve system capacity of the whole satellite communication system, the satellites use multiple beams to cover the ground. One satellite may form several tens or even hundreds of beams to cover the ground, and one satellite beam may cover a ground area with a diameter of several tens to hundreds of kilometers.

HARQ Mechanisms in 5G NR:

There are two levels of retransmission mechanisms in 5G NR, an HARQ mechanism of a media access control (MAC) layer and an automatic repeat request (ARQ) mechanism of an RLC layer. The HARQ mechanism of the MAC layer is mainly for handling retransmission of lost or wrong data, and the ARQ mechanism of the RLC layer is mainly used to supplement the HARQ mechanism of the MAC layer. The HARQ mechanism of the MAC layer can provide fast retransmission, and the ARQ mechanism of the RLC layer can provide reliable data transmission.

In practical applications, the HARQ mechanism uses a stop-and-wait protocol to transmit data. In the stop-and-wait protocol, a transmitting end stops to wait for acknowledgement information after transmitting a transport block (TB). In this way, the transmitting end stops to wait for acknowledgement after each transmission, which will lead to low throughput of users. Therefore, a plurality of parallel HARQ processes can be used in NR, and these HARQ processes together form an HARQ entity, which allows continuous transmission of data in combination with the stop-and-wait protocol, that is, when an HARQ process waits for the acknowledgement information, the transmitting end can use another HARQ process to continue transmitting data, thereby ensuring continuous transmission of data.

It can be understood that HARQ can be divided into uplink HARQ and downlink HARQ. The uplink HARQ aims at uplink data transmission, and the downlink HARQ aims at downlink data transmission, and both are independent of each other.

Based on the provisions of the current NR protocol, each serving cell corresponding to the terminal device has its own HARQ entity, and each HARQ entity maintains a set of parallel downlink HARQ processes and a set of parallel uplink HARQ processes.

At present, each uplink and downlink carrier supports up to 16 HARQ processes. The network device can indicate the maximum number of HARQ processes to the terminal device through semi-static configuration information, which is transmitted through radio resource control (RRC) signaling, according to network deployment situations. If the network device does not provide configuration parameters about HARQ, the number of default downlink HARQ processes is 8, and the maximum number of HARQ processes supported by each uplink carrier is always 16. Each HARQ process corresponds to one HARQ process ID.

For downlink transmission, a broadcast control channel (BCCH) uses a dedicated broadcast HARQ process. For uplink transmission, Msg3 transmission in a random process uses HARQ ID 0.

For a terminal device that does not support downlink space division multiplexing, each downlink HARQ process can only process 1 TB at the same time; for a terminal device that supports downlink space division multiplexing, each downlink HARQ process can process one or two TBs at the same time. Each uplink HARQ process of the terminal device processes 1 TB at the same time.

HARQ is divided into synchronous HARQ and asynchronous HARQ in the time domain and non-adaptive HARQ and adaptive HARQ in the frequency domain. An asynchronous adaptive HARQ mechanism is used in both uplink and downlink of NR. The asynchronous HARQ mechanism is that, retransmission can occur at any time, and a time interval between retransmission and last transmission of the same TB is not fixed. The adaptive HARQ mechanism can change frequency domain resources and a modulation and coding scheme (MCS) used in retransmission.

Logical Channel Prioritization (LCP) in 5G NR:

Like LTE, in 5G NR, the network (i.e., network device) allocates uplink transmission resources per UE rather than per bearer, but data of which bearers can be put into the allocated uplink transmission resources for transmission is determined by the terminal device.

The terminal device needs to determine the amount of transmission data of each logical channel in a media access control protocol data unit (MAC PDU) initially transmitted based on the uplink transmission resources configured by the network, and in some cases, the terminal device also needs to allocate resources for a media access control control element (MAC CE).

In order to implement multiplexing of the uplink logical channel, a priority needs to be assigned to each uplink logical channel. For an MAC PDU of given size, in the case that multiple uplink logical channels have data transmission requirements in the MAC PDU at the same time, resources of the MAC PDU can be sequentially allocated in an order of logical channel priority corresponding to each uplink logical channel from high to low.

At the same time, in order to give consideration to the fairness among different logical channels, a concept of prioritized bit rate (PBR) is introduced. When the terminal device performs multiplexing of the logical channels, the minimum data rate requirement of each logical channel needs to be ensured first, so as to avoid the situation that other uplink logical channels with low priority of the terminal device are "starved to death" because the uplink logical channels with high priority always occupy the uplink resources allocated to the terminal device by the network, that is, the problem that the resources can never be allocated to uplink logical channels with low priority of the terminal device.

Optionally, in order to implement multiplexing of the uplink logical channels, the network device can configure the following parameters for each uplink logical channel through radio resource control (RRC):

logical channel priority: the smaller the value of the priority, the higher the corresponding priority;
prioritized bit rate (PBR): indicating the minimum rate of the logical channel which needs to be guaranteed;
token bucket size duration (BSD): determining the depth of a token bucket.

The MAC of the terminal device implements multiplexing of the uplink logical channels using a token bucket mechanism, and the terminal device maintains a token number variable Bj for each uplink logical channel j, which indicates the number of tokens currently available in the token bucket, a maintaining method is as follows.

A1: when the terminal device establishes the logical channel j, Bj is initialized to 0.

A2: the terminal device increases Bj by PBR*T before each LCP process, wherein T is a time interval between the time point when Bj is increased last time and the current time point.

A3: if Bj is updated according to the act A2 and the updated Bj is larger than the maximum capacity of the token bucket (i.e. PBR*BSD), the value of Bj is set as the maximum capacity of the token bucket.

Optionally, when the terminal device receives a newly-transmitted UL grant from the network device, the terminal device can perform the logical channel prioritization processing according to the following acts.

In Act1, for all logical channels with Bj>0, the terminal device sequentially allocates the resources to the logical channels in an order of logical channel priority from high to low using a given uplink transmission resource MAC PDU, wherein the resources allocated to each logical channel can only meet the requirements on PBR, that is, the number of tokens in the token bucket is determined according to the PBR corresponding to the logical channel j, and then the resources are allocated to the logical channel according to the number of tokens. When the PBR of a certain logical channel is set to infinity, only when the resources of this logical channel are satisfied, logical channels with logical channel priority lower than that of this logical channel will be considered.

In Act2, the resources that can be further allocated to the logical channels are updated, i.e., the size of all MAC service data units (SDU) of the logical channel j that are multiplexed onto the MAC PDU in Act1 is subtracted from Bj.

In Act3, if there are still remaining uplink transmission resources after Act1 and Act2 have been performed, the remaining resources will be sequentially allocated to each logical channel in an order of logical channel priority from high to low regardless of the size of Bj. Only when data carried by the logical channels with high priority have been sent and UL grants have not been exhausted yet, the logical channels with low priority can be served, that is, at this moment the terminal device can guarantee data transmission of the logical channels with high priority to the maximum extent.

At the same time, the terminal device should also follow the following principles when transmitting data using the logical channels.

B1: if the entire RLC SDU to be transmitted by the terminal device can be filled into the remaining uplink transmission resources, the RLC SDU should not be segmented.

B2: if the terminal device segments the RLC SDU in the logical channel, the maximum segment should be padded as far as possible according to the size of the remaining resources.

B3: the terminal device should maximize transmission of the data.

B4: if the size of the UL grant is greater than or equal to 8 bytes and the terminal device has the requirements on data transmission, the terminal device cannot transmit only a padding buffer status report (padding BSR) or padding bit.

For different signals and/or logical channels, when the terminal device performs logical channel prioritization, it also needs to follow the following priority sequencing (arranged in an order of logical channel priority from high to low):

C1: a cell-radio network temporary identifier (C-RNTI) MAC CE or data from an uplink common control channel (UL-CCCH);
C2: a configured grant confirmation MAC CE;
C3: a BSR MAC CE except the padding BSR;
C4: a single entry power headroom reporting (PHR) media access control control element (MAC CE) or a multiple entry power headroom reporting (PHR) media access control control element (MAC CE);
C5: data from any logical channel except UL-CCCH;
C6: an MAC CE used for recommended bit rate query;
C7: a BSR MAC CE used for the padding BSR.

At the present stage, compared with cellular networks used by the NTN and NR, the signal propagation delay between a terminal device and a communication satellite in the NTN increases greatly. Therefore, during NTN standardization, a way to reduce the data transmission delay by disabling an HARQ feedback function has been developed, and the HARQ feedback function can be configured to be enabled/disabled (i.e., the HARQ function is enabled/disabled) based on the HARQ processes, i.e., for a plurality of HARQ processes of one terminal device, the HARQ feedback function of one part of the HARQ processes can be configured to be in an enabled state and the HARQ feedback function of another part of the HARQ processes can be configured to be in a disabled state.

Specifically, when the HARQ feedback function of a certain HARQ process is configured to be in the disabled state, on the one hand, the network device can continue to schedule the HARQ process for data transmission without waiting receiving uplink transmission of the terminal device (which is uplink data transmission for the uplink HARQ and is ACK/HACK feedback for downlink data transmission of the terminal device for the downlink HARQ), thereby reducing the MAC transmission delay; on the other hand, if the network device no longer schedules the HARQ process for retransmission, MAC transmission reliability will be affected.

Different services have different QoS requirements. For example, some services are sensitive to delay, and other services have strict requirements on packet loss rate. For the services which are sensitive to delay, transmission can be performed using an HARQ process of which an HARQ feedback function attribute is the disabled state, thereby reducing the transmission delay. For the services which have strict requirements on packet loss rate, transmission can be performed using an HARQ process of which the HARQ feedback function attribute is the enabled state, thereby improving transmission reliability.

For downlink transmission, the network device, when scheduling resources, can allocate the logical channels having different QoS requirements to different HARQ processes for transmission according to the QoS requirements of different logical channels.

For uplink transmission, the network device allocates the uplink transmission resources (for example, Physical Uplink Shared Channels (PUSCHs)) based on the terminal device, which logical channels are multiplexed on the uplink transmission resources allocated by the network device for transmitting data is determined by the terminal device. Specifically, the terminal device performs multiplexing of the logical channels based on the logical channel priority, prioritized bit rate, and token bucket depth.

However, for the HARQ process of which the HARQ feedback function is disabled and the HARQ process of which the HARQ feedback function is enabled, there is no set of rules at present to specify how to complete multiplexing of the uplink logical channels, that is, the terminal device does not consider the QoS requirements of different services in the uplink transmission process, and may not be able to meet the requirements on transmission delay and/or reliability, thereby affecting the service experience of users.

In view of the above problems, an implementation of the present disclosure provides a method for channel processing, which includes acquiring the uplink transmission resources and an identifier of the HARQ process used for transmitting data on the uplink transmission resources, and then determining a set of candidate logical channels multiplexed on the uplink transmission resources according to an HARQ feedback function state of the HARQ process and an HARQ feedback function attribute of each logical channel. In such a manner, the terminal device can select the multiplexed candidate logical channels to perform data transmission based on the QoS requirements of different services, thereby satisfying the requirements on transmission delay and/or reliability and improving the service experience of users.

Specifically, for the characteristic that the wireless signal transmission delay between the terminal device and the communication satellite in the NTN system changes rapidly, the present disclosure provides a method in which in the NTN, a network device configures attributes of the HARQ feedback function of each uplink logical channel, such as HARQ feedback function enabled. HARQ feedback function disabled, and HARQ feedback function enabled or disabled, and then based on the HARQ feedback function state of the HARQ process used when the data is transmitted on the uplink transmission resources and the attribute of the HARQ feedback function of each uplink logical channel, an appropriate set of candidate logical channels can be selected.

The overall idea of the present disclosure is that the terminal device completes multiplexing of the uplink logical channels according to the uplink transmission resources allocated by the network device. The main inventive point lies in that the network configures the attribute of HARQ feedback function enabled or HARQ feedback function disabled or HARQ feedback function enabled or disabled for the uplink logical channels according to the QoS requirements of services (such as delay, transmission reliability, etc.), and the terminal device determines different sets of candidate logical channels and processing of different logical channel priorities according to the HARQ feedback function state of the HARQ process used in the current uplink data transmission.

The technical solutions of the present disclosure will be described in detail below by specific implementations. It should be noted that the technical solutions of the present disclosure may include portion or all of the following contents, and the following specific implementations may be combined with each other, and the same or similar concepts or processes may not be repeated in some implementations.

Figure 2:
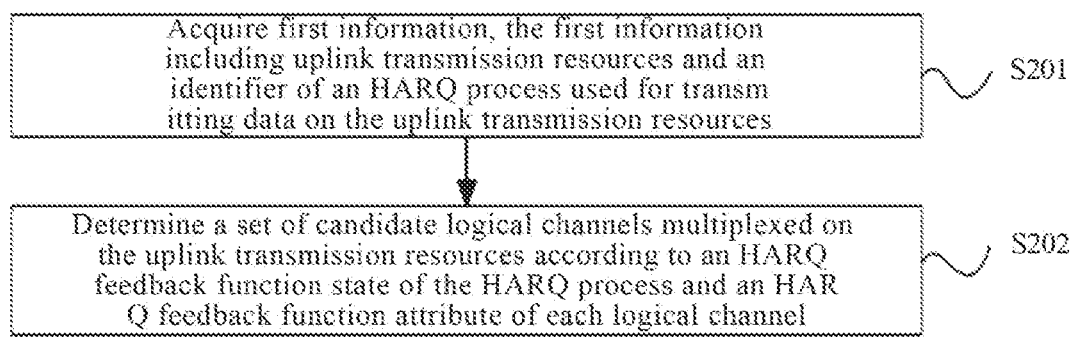
FIG. 2 is a schematic flowchart of a first implementation of a method for channel processing in accordance with the present disclosure.

FIG. 2 is a schematic flowchart of a first implementation of a method for channel processing in accordance with the present disclosure. The method is described with a terminal device being an execution body. As shown in FIG. 2, the method for channel processing may include the following acts.

In S201, first information is acquired, the first information including uplink transmission resources and an identifier of an HARQ process used for transmitting data on the uplink transmission resources.

In an implementation of the present disclosure, when there is a data transmission requirement, the terminal device can acquire the first information sent by a network device by sending a resource scheduling request to the network device, or acquire directly the first information pre-configured by the network device, or acquire the first information determined by the network device from other devices.

Optionally, the first information may include the uplink transmission resources (UL grants) and the identifier of the HARQ process used for transmitting data on the uplink transmission resources. Optionally, the first information may also include indication information for indicating that this uplink transmission is an initial transmission.

It can be understood that neither specific contents included in the first information nor a specific way for the terminal device to acquire the first information is limited in the implementations of the present disclosure, and both of them can be determined according to actual application scenarios and will not be repeated herein.

In S202, a set of candidate logical channels multiplexed on the uplink transmission resources is determined according to an HARQ feedback function state of the HARQ process and an HARQ feedback function attribute of each logical channel.

In this implementation, there is a plurality of logical channels between the terminal device and the network device. The network device will configure relevant parameters for each logical channel, such as a logical channel priority, a prioritized bit rate, a token bucket size duration and an HARQ feedback function attribute of the logical channel. Meanwhile, the network device will also configure the number of uplink HARQ processes and the HARQ feedback function state of each uplink HARQ process for the terminal device. Therefore, in order to improve the usage experience of users, the terminal device can determine the set of candidate logical channels, which can be multiplexed in the uplink transmission process, according to the HARQ feedback function state of the HARQ process and the HARQ feedback function attribute of each logical channel.

Optionally, in one possible design, the set of candidate logical channels may include a logical channel, of which the HARQ feedback function attribute is consistent and/or partially consistent with the HARQ feedback function state of the HARQ process, among all logical channels in which there is currently data to be transmitted. In another possible design, the set of candidate logical channels may include a first set of candidate logical channels and a second set of candidate logical channels, wherein the first set of candidate logical channels includes a logical channel, of which the HARQ feedback function attribute is consistent and/or partially consistent with the HARQ feedback function state of the HARQ process, among all logical channels in which there is currently data to be transmitted; the second set of candidate logical channels includes a logical channel, of which the HARQ feedback function attribute is HARQ feedback function enabled or disabled, among all logical channels in which there is currently data to be transmitted.

The specific composition of the set of candidate logical channels may be any of the above-mentioned compositions, and will not be limited in the implementations of the present disclosure.

In a method for channel processing in accordance with an implementation of the present disclosure, the uplink transmission resources and the identifier of the HARQ process used for transmitting data on the uplink transmission resources are acquired, and then the set of candidate logical channels multiplexed on the uplink transmission resources is determined according to the HARQ feedback function state of the HARQ process and the HARQ feedback function attribute of each logical channel. In such a manner, the terminal device can select the multiplexed candidate logical channels to perform data transmission based on the QoS requirements of different services, thereby satisfying the requirements on transmission delay and/or reliability and improving the service experience of users.

Figure 3:
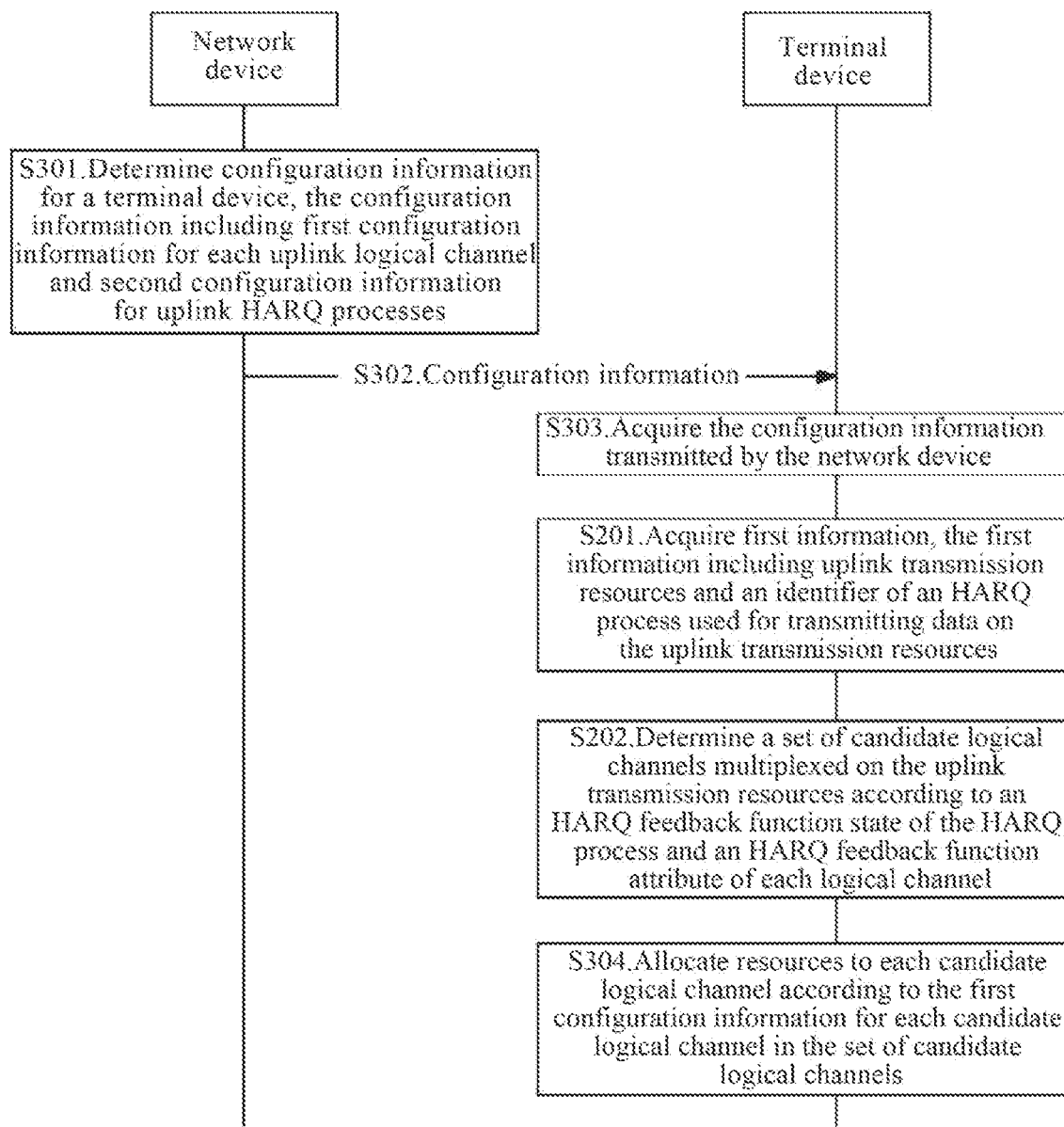
FIG. 3 is a schematic interaction diagram of a second implementation of a method for channel processing in accordance with the present disclosure.

Exemplarily, based on the above-described implementations, FIG. 3 is a schematic interaction diagram of a second implementation of a method for channel processing in accordance with the present disclosure. The method is described with information interaction between the terminal device and the network device. As shown in FIG. 3, the method for channel processing may include the following acts.

In S301, a network device determines configuration information for a terminal device, the configuration information including first configuration information for each uplink logical channel and second configuration information for uplink HARQ processes.

The first configuration information includes a logical channel priority, a prioritized bit rate, a token bucket size duration and an HARQ feedback function attribute. The second configuration information includes the number of uplink HARQ processes and an HARQ feedback function state of each HARQ process.

In this implementation, the logical channel priority is used to characterize a precedence order by which the logical channels can be used. The smaller the value of the logical channel priority, the higher the priority of the corresponding logical channel. The logical channel with higher priority can be used preferentially. The prioritized bit rate is the minimum data rate configured for each logical channel in order to give consideration to the fairness between different logical channels. The token bucket size duration is primarily used to determine the depth of a token bucket and further determine the maximum capacity of the token bucket.

The HARQ feedback function attribute is one of the following attributes: HARQ feedback function enabled, HARQ feedback function disabled, and HARQ feedback function enabled or disabled.

Specifically, the attribute of HARQ feedback function enabled means that the logical channel is suitable for multiplexing onto uplink transmission resources on which the HARQ feedback function is enabled, the attribute of HARQ feedback function disabled means that the logical channel is suitable for multiplexing onto uplink transmission resources on which the HARQ feedback function is disabled, and the attribute of HARQ feedback function enabled or disabled means that the logical channel is suitable for multiplexing onto uplink transmission resources on which the HARQ feedback function is enabled or disabled.

In this implementation, in order to implement uplink transmission of data, the network device needs to configure the number of HARQ processes used for uplink transmission for the terminal device. Further, in order to meet different QoS requirements of different services, in this implementation, the network device can also determine the HARQ feedback function state of each HARQ process configured for the terminal device, so that the terminal device can select the appropriate HARQ processes based on different services' requirements on time delay and/or reliability.

Specifically, the network device can respectively configure the logical channel priority, the PBR, the BSD and the attribute of HARQ feedback function enabled or HARQ feedback function disabled or HARQ feedback function enabled or disabled for each uplink logical channel of the terminal device through the first configuration information.

In addition, the network device can also configure the number of uplink HARQ processes and the HARQ feedback function state (enabled or disabled state) of each uplink HARQ process for the terminal device through the second configuration information.

In S302, the network device transmits the configuration information to the terminal device.

In an implementation of the present disclosure, after determining the configuration information for the terminal device, the network device transmits the configuration information to the terminal device, so that the terminal device can know the attribute of each logical channel, the number of HARQ processes between the network device and the terminal device, and the HARQ feedback function state of each HARQ process.

Optionally, the network device can transmit the configuration information through radio resource control (RRC) signaling or MAC CE or through other signaling. The specific way to transmit the configuration information is not limited in the implementations of the present disclosure and will not be repeated herein.

Accordingly, in an implementation of the present disclosure, before performing the above-mentioned S201 (acquiring the first information), the terminal device may also perform the following acts.

In S303, the terminal device acquires the configuration information transmitted by the network device.

In this implementation, the terminal device can determine the HARQ feedback function attribute of each logical channel and the HARQ feedback function state of each HARQ process, both of which are determined based on the configuration information transmitted by the network device. Therefore, when there is an uplink data transmission requirement, the terminal device first needs to acquire the configuration information transmitted by the network device.

Optionally, in an implementation of the present disclosure, referring to FIG. 3, the method for channel processing may further include the following acts.

In S304, the terminal device allocates resources to each candidate logical channel according to the first configuration information for each candidate logical channel in the set of candidate logical channels.

Optionally, after the terminal device determines the set of candidate logical channels multiplexed on the uplink transmission resources, the terminal device can allocate the resources to each candidate logical channel based on the first configuration information for each candidate logical channel acquired from the network device, and then perform uplink transmission of the data through each candidate logical channel.

Specifically, the terminal device performs respectively a first round of resource allocation and a second round of resource allocation based on the logical channel priority, the PBR and the BSD of each candidate logical channel. The specific implementations regarding the first round of resource allocation and the second round of resource allocation can be understood with reference to the following contents, and will not be repeated herein.

In a method for channel processing in accordance with an implementation of the present disclosure, the network device determines the configuration information for the terminal device, and sends the configuration information to the terminal device. The configuration information includes the first configuration information for each uplink logical channel and the second configuration information for the uplink HARQ processes. Therefore, the terminal device can determine logical channels satisfying different service requirements, such that the QoS requirements of different services can be satisfied, thereby laying a foundation for improving the service experience of users.

Exemplarily, in any one of the above implementations of the present disclosure, the set of candidate logical channels may be implemented using any of the following possible designs.

In one possible design of the present disclosure, the set of candidate logical channels includes a logical channel, of which the HARQ feedback function attribute is consistent and/or partially consistent with the HARQ feedback function state of the HARQ process, among all logical channels in which there is currently data to be transmitted.

Specifically, as an example, if the HARQ feedback function state of the HARQ process is an enabled state, the set of candidate logical channels includes: a logical channel, of which the HARQ feedback function attribute is HARQ feedback function enabled, and a logical channel, of which the HARQ feedback function attribute is HARQ feedback function enabled or disabled, among all logical channels in which there is currently data to be transmitted.

As another example, if the HARQ feedback function state of the HARQ process is a disabled state, the set of candidate logical channels includes: a logical channel, of which the HARQ feedback function attribute is HARQ feedback function disabled, and a logical channel, of which the HARQ feedback function attribute is HARQ feedback function enabled or disabled, among all logical channels in which there is currently data to be transmitted.

In this implementation, it can be understood that for uplink transmission of the HARQ processes, of which the HARQ feedback function is enabled, the terminal device only multiplexes an uplink logical channel, of which the HARQ feedback function attribute is HARQ feedback function enabled or HARQ feedback function enabled or disabled, onto the uplink transmission resources in this transmission; for uplink transmission of the HARQ processes, of which the HARQ feedback function is disabled, the terminal device only multiplexes an uplink logical channel, of which the HARQ feedback function attribute is HARQ feedback function disabled or HARQ feedback function enabled or disabled, onto the uplink transmission resources in this transmission.

In this implementation, the terminal device only multiplexes a logical channel, of which the HARQ feedback function attribute is consistent and/or partially consistent with the HARQ feedback function state of the HARQ process, and a logical channel, of which the HARQ feedback function attribute is HARQ feedback function enabled or disabled, such that different services' requirements on delay and/or reliability can be met, thereby avoiding the problem of poor user experience due to inconsistent service requirements existing in the prior channel multiplexing method.

Exemplarily, in this possible design of the present disclosure, when the set of candidate logical channels includes a logical channel, of which the HARQ feedback function attribute is consistent with the HARQ feedback function state of the HARQ process, and a logical channel, of which the HARQ feedback function attribute is HARQ feedback function enabled or disabled, among all logical channels in which there is currently data to be transmitted, the above-mentioned S304 can be specifically implemented by the following act: allocating the resources to each candidate logical channel according to the prioritized bit rate, the logical channel priority, and the token bucket size duration of each candidate logical channel in the set of candidate logical channels.

As an example, if the HARQ feedback function of the HARQ process used in this uplink transmission indicated in the first information is in the enabled state, the terminal device allocates the resources to each candidate logical channel in the set of candidate logical channels according to the following acts, i.e., implements multiplexing of the logical channels.

In D11, the candidate logical channels in this uplink transmission are determined. A logical channel, of which the HARQ feedback function attribute is HARQ feedback function disabled or HARQ feedback function enabled or disabled, is selected among all logical channels in which there is currently data to be transmitted.

In D12, the first round of resource allocation is performed, that is, the resources satisfying the PBR are allocated to each candidate logical channel in the set of candidate logical channels. For all candidate logical channels with a token number variable Bj>0 in the set of candidate logical channels, the resources are sequentially allocated in an order of logical channel priority from high to low. In this round of resource allocation, the resources allocated to each candidate logical channel can only meet the requirements on the PBR, that is, the number of tokens in the token bucket is determined according to the PBR corresponding to the candidate logical channel j, and then the resources are allocated to the candidate logical channel according to the number of tokens.

In D13, for the candidate logical channel j, to which the resources are allocated in D12, the size of the candidate logical channel j multiplexed onto the uplink transmission resources in D12 is subtracted from Bj of the candidate logical channel j, i.e., the size of all MAC SDUs of the candidate logical channel j that are multiplexed onto an MAC PDU in D12 is subtracted from Bj of the candidate logical channel j.

In D14, for all the candidate logical channels determined in D11, if there are still remaining uplink transmission resources after the act D12 is performed, the remaining uplink transmission resources are sequentially allocated to each candidate logical channel in the set of candidate logical channels in an order of logical channel priority from high to low regardless of the size of Bj of each candidate logical channel.

As another example, if the HARQ feedback function of the HARQ processes used in this uplink transmission indicated in the first information is in the disabled state, the terminal device allocates the resources to each candidate logical channel in the set of candidate logical channels according to the following acts.

In D21, the candidate logical channels in this uplink transmission are determined, i.e., a logical channel, of which the HARQ feedback function attribute is HARQ feedback function disabled or HARQ feedback function enabled or disabled, is selected among all logical channels in which there is currently data to be transmitted.

In D22, the first round of resource allocation is performed, that is, the resources satisfying the PBR are allocated to each candidate logical channel. For all candidate logical channels with a token number variable Bj>0, the resources are sequentially allocated in an order of logical channel priority from high to low. The resources allocated to each candidate logical channel can only meet the requirements on the PBR, that is, the number Bj of tokens in the token bucket is determined according to the PBR corresponding to the candidate logical channel j, and then the resources are allocated to the candidate logical channel according to the number of tokens.

In D23, for the candidate logical channel j, to which the resources are allocated in D22, the size of all MAC SDUs of the candidate logical channel j that are multiplexed onto an MAC PDU in D22 is subtracted from Bj of the candidate logical channel j.

In D241, for all the candidate logical channels determined in D21, if there are still remaining uplink transmission resources after the act D22 is performed, the remaining uplink transmission resources are sequentially allocated to each candidate logical channel in an order of logical channel priority from high to low regardless of the size of Bj of each candidate logical channel.

The above acts D11 to D14 and/or D21 to D24 will be described specifically below through an example.

Figure 4:
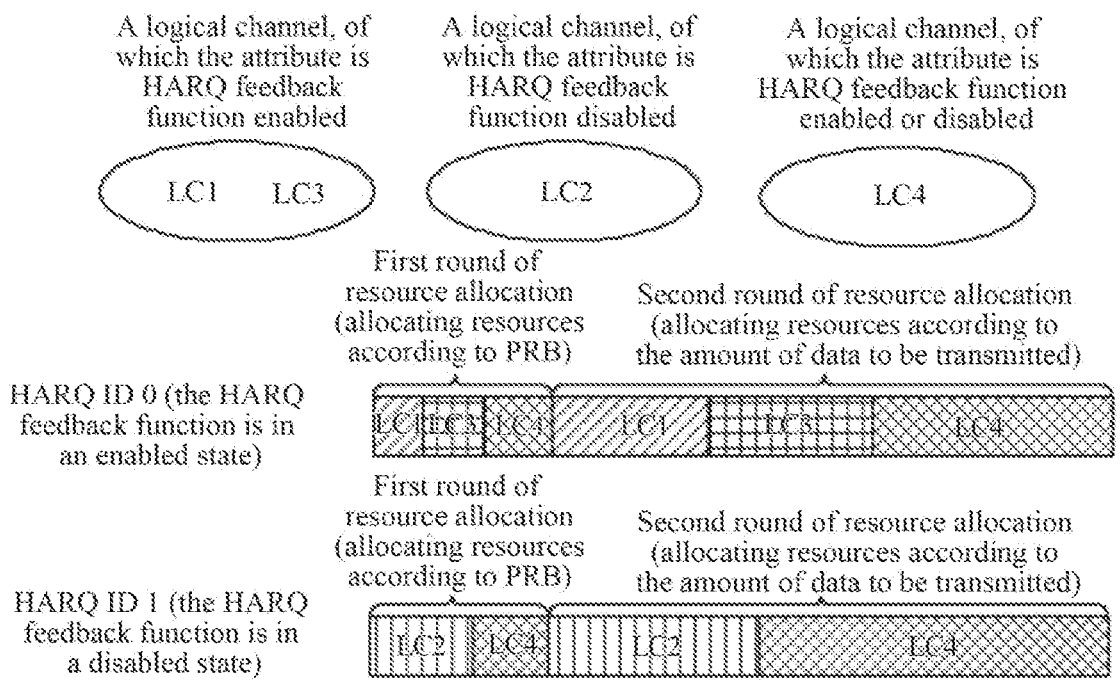
FIG. 4 is a schematic diagram of HARQ feedback function attributes of logical channels that a terminal device has and a resource allocation of each logical channel.

Exemplarily, FIG. 4 is a schematic diagram of HARQ feedback function attributes of logical channels that a terminal device has and a resource allocation of each logical channel. Referring to FIG. 4, it is assumed that the terminal device has established four uplink logical channels in total, LC1, LC2, LC3 and LC4, respectively. The specific acts for the terminal device to perform logical channel selection and resource allocation are as follows.

(41) The terminal device receives radio resource control (RRC) configuration information transmitted by the network device. This act includes specifically the following sub-acts.

(41.1) Configuration of logical channels: for each uplink logical channel of the terminal device, the logical channel priority (assuming that the logical channel priority of each uplink logical channel is LC1>LC2>LC3>LC4), the PBR and the BSD are configured; meanwhile the attributes of LC1 and LC3 are configured to be HARQ feedback function enabled, the attribute of LC2 is configured to be HARQ feedback function disabled, and the attribute of LC4 is configured to be HARQ feedback function enabled/disabled.

(41.2) Configuration of the uplink HARQ processes: two uplink HARQ process numbers, which are HARQ ID 0 and HARQ ID 1 respectively, are configured for the terminal device; meanwhile the HARQ feedback function of HARQ ID 0 is configured to be in the enabled state and the HARQ feedback function of HARQ ID 1 is configured to be in the disabled state.

As an example, (42) the terminal device receives the first information transmitted by the network device, the first information including the uplink transmission resources and HARQ ID 0 of the HARQ process used for transmitting data on the uplink transmission resources. Since the HARQ feedback function of HARQ ID 0 is in the enabled state, the terminal device completes multiplexing of the logical channels according to the following acts.

(42.1) LC1, LC3 and LC4 are selected as the candidate logical channels in this uplink transmission.

(42.2) The first round of resource allocation is performed, the resources satisfying the PBR are sequentially allocated to LC1, LC3 and LC4, and the numbers of tokens in PBR token buckets corresponding to LC1, LC3 and LC4 are updated according to the resource allocation result.

(42.3) The second round of resource allocation is performed, i.e., the remaining uplink transmission resources are sequentially allocated to LC1, LC3 and LC4 according to the mount of remaining data to be transmitted and the mount of remaining resources of the uplink transmission resources.

As another example, (43) the terminal device receives the first information transmitted by the network device, the first information including the uplink transmission resources and HARQ ID 1 of the HARQ process used for transmitting data on the uplink transmission resources, since the HARQ feedback function of HARQ ID 1 is in the disabled state, the terminal device completes multiplexing of the logical channels according to the following acts.

(43.1) LC2 and LC4 are selected as the candidate logical channels in this uplink transmission.

(43.2) The first round of resource allocation is performed, i.e., the resources satisfying the PBR are sequentially allocated to LC2 and LC4, and the numbers of tokens in PBR token buckets corresponding to LC2 and LC4 are updated according to the resource allocation result.

(43.3) The second round of resource allocation is performed, i.e., the remaining resources are sequentially allocated to LC2 and LC4 according to the mount of remaining data to be transmitted and the mount of remaining resources of the uplink transmission resources.

In another possible design of the present disclosure, the set of candidate logical channels includes a first set of candidate logical channels and a second set of candidate logical channels.

The first set of candidate logical channels includes a logical channel, of which the HARQ feedback function attribute is consistent with the HARQ feedback function state of the HARQ process, among all logical channels in which there is currently data to be transmitted; and the second set of candidate logical channels includes a logical channel, of which the HARQ feedback function attribute is HARQ feedback function enabled or disabled, among all logical channels in which there is currently data to be transmitted.

In this possible design, as an example, if the HARQ feedback function state of the HARQ process is the enabled state, the first set of candidate logical channels includes a logical channel, of which the HARQ feedback function attribute is HARQ feedback function enabled, among all logical channels in which there is currently data to be transmitted.

As another example, if the HARQ feedback function state of the HARQ process is the disabled state, the first set of candidate logical channels includes a logical channel, of which the HARQ feedback function attribute is HARQ feedback function disabled, among all logical channels in which there is currently data to be transmitted.

Specifically, in this implementation, the terminal device divides the candidate logical channels into the first set of candidate logical channels and the second set of candidate logical channels with different candidate sequences based on the HARQ feedback function attributes and HARQ feedback function states of the logical channels. In practical applications, the terminal device first multiplexes the first set of candidate logical channels composed of the logical channels, of which the HARQ feedback function attributes are consistent with the HARQ feedback function state of the HARQ process, and then multiplexes the logical channels, of which the HARQ feedback function attributes are HARQ feedback function enabled or disabled, so that data transmission of the logic channels with consistent attributes can be guaranteed preferentially, and the resource utilization rate can be improved on this basis.

Exemplarily, in this possible design of the present disclosure, when the set of candidate logical channels includes the first set of candidate logical channels and the second set of candidate logical channels, the above-mentioned S304 may be specifically implemented by a first possible implementation or a second possible implementation.

Specifically, in the first possible implementation of S304, for uplink transmission of an HARQ process in which the HARQ feedback function is enabled, the terminal device preferentially multiplexes an uplink logical channel, of which the HARQ feedback function attribute is HARQ feedback function enabled, onto the uplink transmission resources in this transmission. If there are still remaining resources after each round of resource allocation (the first round of resource allocation and the second round of resource allocation) is performed, the terminal device continues to multiplex an uplink logical channel, of which the HARQ feedback function attribute is HARQ feedback function enabled/disabled, onto the uplink transmission resources in this transmission.

In the first possible implementation of S304, for uplink transmission of an HARQ process in which the HARQ feedback function is disabled, the terminal device preferentially multiplexes an uplink logical channel, of which the HARQ feedback function attribute is HARQ feedback function disabled, onto the uplink transmission resources in this transmission. If there are still remaining resources after each round of resource allocation is performed, the terminal device continues to multiplex an uplink logical channel, of which the HARQ feedback function attribute is HARQ feedback function enabled/disabled, onto the uplink transmission resources in this transmission.

Figure 5:
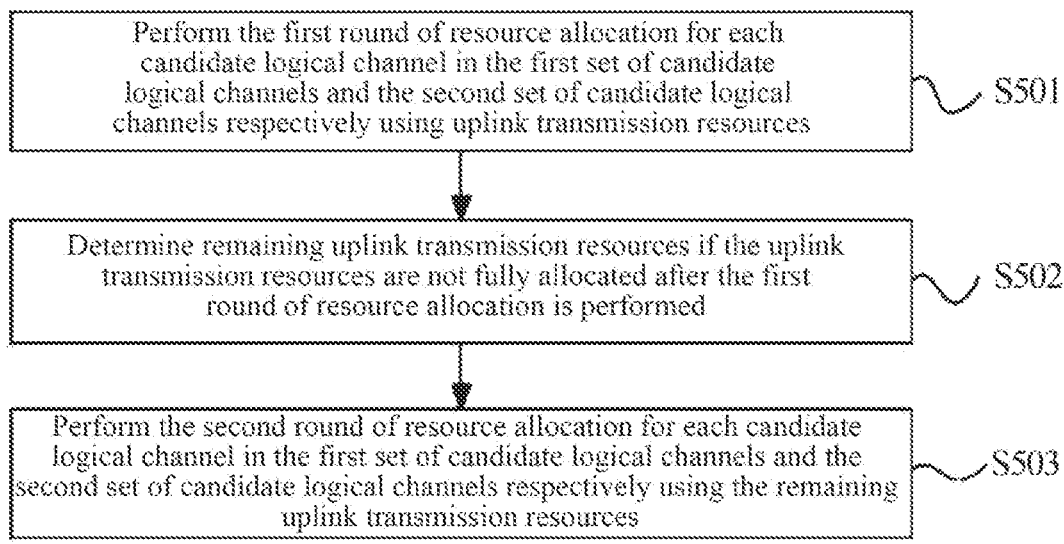
FIG. 5 is a schematic flowchart of a third implementation of a method for channel processing in accordance with the present disclosure.

Exemplarily, FIG. 5 is a schematic flowchart of a third implementation of a method for channel processing in accordance with the present disclosure. Referring to FIG. 5, when the set of candidate logical channels includes the first set of candidate logical channels and the second set of candidate logical channels, the first possible implementation of S304 is specifically as follows.

In S501, the first round of resource allocation is performed for each candidate logical channel in the first set of candidate logical channels and the second set of candidate logical channels respectively using uplink transmission resources.

Optionally, the first round of resource allocation includes a primary first round of resource allocation for the first set of candidate logical channels and a secondary first round of resource allocation for the second set of candidate logical channels.

In an implementation of the present disclosure, the terminal device firstly performs the primary first round of resource allocation for each candidate logical channel in the first set of candidate logical channels using the uplink transmission resources according to the prioritized bit rate, the logical channel priority, and the token bucket size duration of each candidate logical channel in the first set of candidate logical channels; secondly, if the uplink transmission resources are not fully allocated after the primary first round of resource allocation is performed, determines first uplink remaining transmission resources, and finally performs the secondary first round of resource allocation for each candidate logical channel in the second set of candidate logical channels using the first uplink remaining transmission resources according to the prioritized bit rate, the logical channel priority, and the token bucket size duration of each candidate logical channel in the second set of candidate logical channels.

Specifically, for all candidate logical channel with Bj>0 in the first set of candidate logical channels, the terminal device first performs the primary first round of resource allocation in an order of logical channel priority from high to low. The resources allocated to each logical channel can only meet the requirements on the PBR. Then, for the candidate logical channel j, to which the resources are allocated, in the first set of candidate logical channels, the size of all MAC SDUs of the candidate logical channel j that are multiplexed onto an MAC PDU in the primary first round of resource allocation, is subtracted from Bj of the candidate logical channel j.

Optionally, for the first set of candidate logical channels, if there are still remaining uplink transmission resources after the primary first round of resource allocation is performed, the secondary first round of resource allocation continues to be performed for the determined second set of candidate logical channels.

Specifically, for all candidate logical channel with Bj>0 in the second set of candidate logical channels, the terminal device first performs the secondary first round of resource allocation in an order of logical channel priority from high to low, wherein the resources allocated to each logical channel can only meet the requirements on the PBR, and then, for the candidate logical channel j, to which the resources are allocated, in the second set of candidate logical channels, the size of all MAC SDUs of the candidate logical channel j that are multiplexed onto an MAC PDU in the secondary first round of resource allocation, is subtracted from Bj.

It can be understood that specific acts of the primary first round of resource allocation are similar to those of the secondary first round of resource allocation, the difference is that objects of the primary first round of resource allocation are the logical channels in the first set of candidate logical channels, and objects of the secondary first round of resource allocation are the logical channels in the second set of candidate logical channels.

In S502, if the uplink transmission resources are not fully allocated after the first round of resource allocation is performed, remaining uplink transmission resources are determined.

In this implementation, if the uplink transmission resources are not fully allocated and there are still remaining data to be transmitted after the terminal device performs the first round of resource allocation for the first set of candidate logical channels and the second set of candidate logical channels using the uplink transmission resources according to above-mentioned S501, the remaining uplink transmission resources are determined.

In S503, the second round of resource allocation is performed for each candidate logical channel in the first set of candidate logical channels and the second set of candidate logical channels respectively using the remaining uplink transmission resources.

Optionally, in this possible implementation, the remaining uplink transmission resources are second uplink remaining transmission resources. The specific implementation of the act includes: performing sequentially a primary second round of resource allocation for each candidate logical channel in the first set of candidate logical channels in an order of logical channel priority from high to low using the second uplink remaining transmission resources; if the second uplink remaining transmission resources are not fully allocated after the primary second round of resource allocation is performed, determining third uplink remaining transmission resources; and finally performing sequentially a secondary second round of resource allocation for each candidate logical channel in the second set of candidate logical channels in an order of logical channel priority from high to low using the third uplink remaining transmission resources.

Specifically, the primary second round of resource allocation is performed for each candidate logical channel in the first set of candidate logical channels, that is, the remaining uplink transmission resources (second uplink remaining transmission resources) are sequentially allocated to each candidate logical channel in the first set of candidate logical channels in an order of logical channel priority from high to low regardless of the size of the token number variable Bj of each candidate logical channel.

Optionally, if there are still second remaining uplink transmission resources after the terminal device performs the primary second round of resource allocation, the secondary second round of resource allocation is performed for each candidate logical channel in the second set of candidate logical channels, that is, the remaining resources (third uplink remaining transmission resources) are sequentially allocated to each candidate logical channel in the second set of candidate logical channels in an order of logical channel priority from high to low regardless of the size of Bj.

The implementation mode of the implementation shown in FIG. 5 will be described specifically below through an example.

Figure 6:
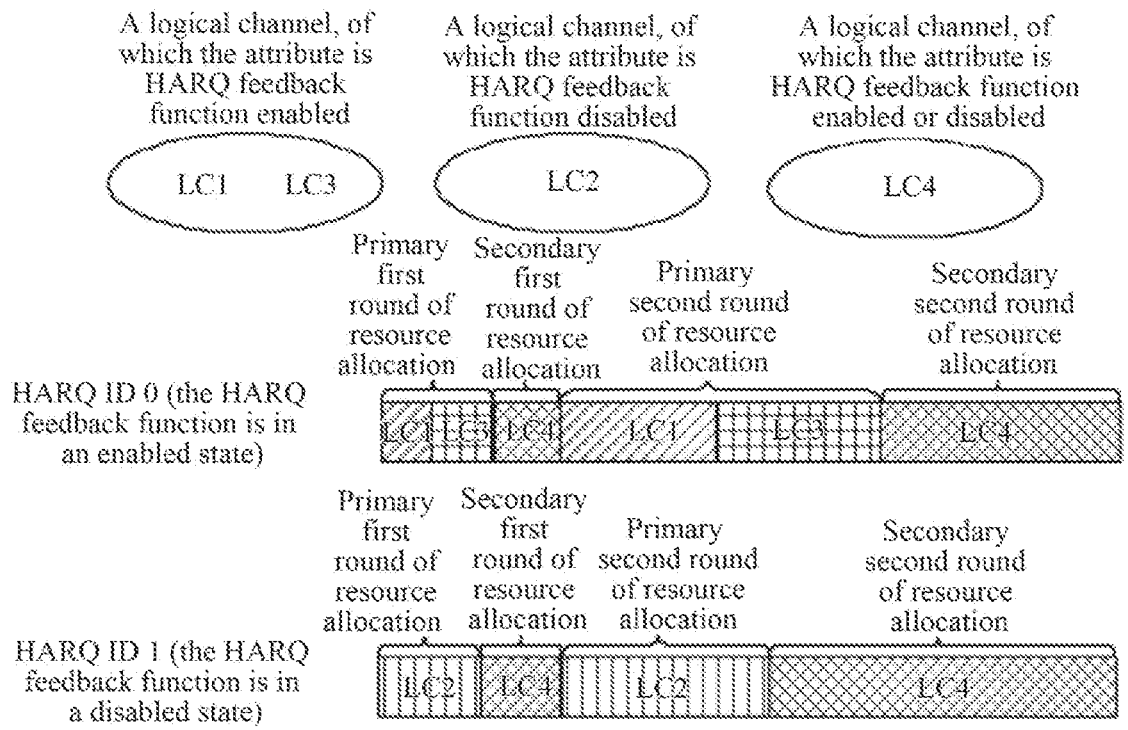
FIG. 6 is a schematic diagram of HARQ feedback function attributes of logical channels that a terminal device has and another resource allocation of each logical channel.

Exemplarily, FIG. 6 is a schematic diagram of HARQ feedback function attributes of logical channels that a terminal device has and another resource allocation of each logical channel. Referring to FIG. 6, it is assumed that the terminal device has established four uplink logical channels in total, LC1, LC2, LC3 and LC4, respectively. The specific acts for the terminal device to perform logical channel selection and resource allocation are as follows.

(61) The terminal device receives RRC configuration information transmitted by the network device.

The specific implementation of (61), which is consistent with the specific implementation of (41) in the schematic diagram corresponding to FIG. 4, can be understood with reference to records in the schematic diagram shown in FIG. 4 and will not be repeated herein.

The logical channel priority of each logical channel that the terminal device has is LC1>LC2>LC3>LC4, the attributes of LC1 and LC3 are HARQ feedback function enabled, the attribute of LC2 is HARQ feedback function disabled, and the attribute of LC4 is HARQ feedback function enabled/disabled. The terminal device has two uplink HARQ process numbers, HARQ ID 0 and HARQ ID 1 respectively, and the HARQ feedback function of HARQ ID 0 is in the enabled state, and the HARQ feedback function of HARQ ID 1 is in the disabled state.

As an example, (62) the terminal device receives the first information transmitted by the network device, the first information including the uplink transmission resources and HARQ ID 0 of the HARQ process used for transmitting data on the uplink transmission resources. Since the HARQ feedback function of HARQ ID 0 is in the enabled state, the terminal device completes multiplexing of the logical channels according to the following acts.

(62.1) LC1 and LC3 are selected as the first se of candidate logical channels in this uplink transmission, and LC4 is selected as the second set of candidate logical channels in this uplink transmission.

(62.2) The first round of resource allocation is performed, i.e., the terminal device first allocates the resources satisfying the PBR to LC1 and LC3 (the primary first round of resource allocation), and updates the numbers of tokens in PBR token buckets corresponding to LC1 and LC3 according to the resource allocation result; if there are still remaining uplink transmission resources after the primary first round of resource allocation is performed, the terminal device continues to allocate the resources satisfying the PBR to LC4 (the secondary first round of resource allocation), and updates the number of tokens in a PBR token bucket corresponding to LC4 according to the resource allocation result.

(62.3) The second round of resource allocation is performed, i.e., the terminal device first allocates the remaining uplink transmission resources to LC1 and LC3 (the primary second round of resource allocation), and then allocates the resources to LC4 (the secondary second round of resource allocation) if there are still remaining uplink transmission resources after the primary second round of resource allocation is performed.

As another example, (63) the terminal device receives the first information transmitted by the network device, the first information including the uplink transmission resources and HARQ ID 1 of the HARQ process used when the data is transmitted on the uplink transmission resources, since the HARQ feedback function of HARQ ID 1 is in the disabled state, the terminal device completes multiplexing of the logical channels according to the following acts.

(63.1) LC2 is selected as the first set of candidate logical channels in this uplink transmission, and LC4 is selected as the second set of candidate logical channels in this uplink transmission.

(63.2) The first round of resource allocation is performed, i.e., the terminal device allocates the resources satisfying the PBR to LC2 (the primary first round of resource allocation), and updates the number of tokens in a PBR token bucket corresponding to LC2 according to the resource allocation result. If there are still remaining uplink transmission resources after the primary first round of resource allocation is performed, the terminal device continues to allocate the resources satisfying the PBR to LC4 (the secondary first round of resource allocation), and updates the number of tokens in the PBR token bucket corresponding to LC4 according to the resource allocation result.

(63.3) The second round of resource allocation is performed, i.e., the terminal device allocates the remaining uplink transmission resources to LC2 (the primary second round of resource allocation), and then allocates the resources to LC4 (the secondary second round of resource allocation) if there are still remaining uplink transmission resources after the primary second round of resource allocation is performed.

In a method for channel processing in accordance with an implementation of the present disclosure, the terminal device first performs the first round of resource allocation for each candidate logical channel in the first set of candidate logical channels and the second set of candidate logical channels respectively using the uplink transmission resources. If the uplink transmission resources are not fully allocated after the first round of resource allocation is performed, the terminal device determines the remaining uplink transmission resources, and finally performs the second round of resource allocation for each candidate logical channel in the first set of candidate logical channels and the second se of candidate logical channels respectively using the remaining uplink transmission resources. In this technical solution, the terminal device first multiplexes the first set of candidate logical channels, and then multiplexes the second set of candidate logical channels, so that data transmission of the logical channels with consistent attributes can be guaranteed preferentially. Further, the resource utilization rate can be improved through the first round of resource allocation and the second round of resource allocation, thereby improving the service experience of users.

Optionally, in the second possible implementation of S304, for uplink transmission of an HARQ process in which the HARQ feedback function is enabled, the terminal device preferentially multiplexes an uplink logical channel (the first set of candidate logical channels), of which the feedback function attribute is HARQ feedback function enabled, onto the uplink transmission resources in this transmission, and if there are still remaining resources after the second round of resource allocation is performed, the terminal device continues to multiplex an uplink logical channel (the second set of candidate logical channels), of which the HARQ feedback function attribute is HARQ feedback function enabled/disabled, onto the uplink transmission resources in this transmission.

In the second possible implementation of S304, for uplink transmission of the HARQ process in which the HARQ feedback function is disabled, the terminal device preferentially multiplexes an uplink logical channel, of which the HARQ feedback function attribute is HARQ feedback function disabled, onto the uplink transmission resources in this transmission, and if there are still remaining resources after the second round of resource allocation is performed, the terminal device continues to multiplex an uplink logical channel, of which the HARQ feedback function attribute is HARQ feedback function enabled/disabled, onto the uplink transmission resources in this transmission.

Figure 7:
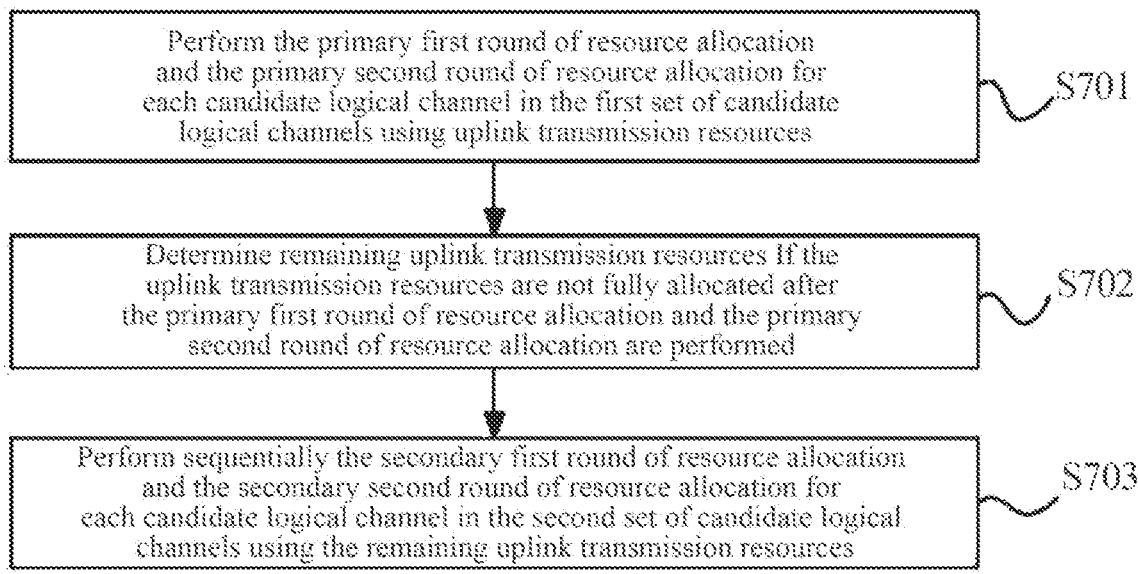
FIG. 7 is a schematic flowchart of a fourth implementation of a method for channel processing in accordance with the present disclosure.

Exemplarily, FIG. 7 is a schematic flowchart of a fourth implementation of a method for channel processing in accordance with the present disclosure. Referring to FIG. 7, when the set of candidate logical channels includes the first set of candidate logical channels and the second set of candidate logical channels, the second possible implementation of S304 is specifically as follows.

In S701, the primary first round of resource allocation and the primary second round of resource allocation are performed for each candidate logical channel in the first set of candidate logical channels using the uplink transmission resources.

Optionally, in this implementation, the terminal device firstly performs the primary first round of resource allocation for each candidate logical channel in the first set of candidate logical channels using the uplink transmission resources according to the prioritized bit rate, the logical channel priority, and the token bucket size duration of each candidate logical channel in the first set of candidate logical channels. Secondly, if the uplink transmission resources are not fully allocated after the primary first round of resource allocation is performed, the terminal device determines fourth uplink remaining transmission resources. And finally the terminal device performs the primary second round of resource allocation sequentially for each candidate logical channel in the first set of candidate logical channels in an order of logical channel priority from high to low using the fourth uplink remaining transmission resources.

Specifically, for all candidate logical channel with $B_j>0$ in the first set of candidate logical channels, the terminal device first performs the primary first round of resource allocation in an order of logical channel priority from high to low, wherein the resources allocated to each logical channel can only meet the requirements on the PBR. And then, for the candidate logical channel j, to which the resources are allocated, in the first set of candidate logical channels, the terminal device updates the number of tokens in the PBR token bucket corresponding to each candidate logical channel in the first set of candidate logical channels according to the resource allocation result.

Optionally, for the first set of candidate logical channels, if there are still remaining uplink transmission resources after the primary first round of resource allocation is performed, the remaining uplink transmission resources (fourth uplink remaining transmission resources) are sequentially allocated to each candidate logical channel in the first set of candidate logical channels in an order of logical channel priority from high to low (the primary second round of resource allocation) regardless of the size of the token number variable $B_j$ of each candidate logical channel in the first set of candidate logical channels.

In S702, if the uplink transmission resources are not fully allocated after the primary first round of resource allocation and the primary second round of resource allocation are performed, the remaining uplink transmission resources are determined.

In this implementation, if the uplink transmission resources are not fully allocated and there are still remaining data to be transmitted after the terminal device performs the primary first round of resource allocation and the primary secondary round of resource allocation for the first set of candidate logical channels using the uplink transmission resources according to above-mentioned S701, then the remaining uplink transmission resources are determined.

In S703, the secondary first round of resource allocation and the secondary second round of resource allocation are performed sequentially for each candidate logical channel in the second set of candidate logical channels using the remaining uplink transmission resources.

Optionally, in this possible implementation, the remaining uplink transmission resources are fifth uplink remaining transmission resources. The specific implementation of the act includes: the terminal device first performs the secondary first round of resource allocation for each candidate logical channel in the second set of candidate logical channels using the fifth uplink remaining transmission resources according to the prioritized bit rate, the logical channel priority, and the token bucket size duration of each candidate logical channel in the second set of candidate logical channels; secondly, if the fifth uplink remaining transmission resources are not fully allocated after the secondary second round of resource allocation is performed, determines sixth uplink remaining transmission resources; and finally performs sequentially the secondary second round of resource allocation for each candidate logical channel in the second set of candidate logical channels using the sixth uplink remaining transmission resources in an order of logical channel priority from high to low.

Specifically, the secondary first round of resource allocation and the secondary second round of resource allocation are performed for each candidate logical channel in the second set of candidate logical channels.

It can be understood that the process in which the terminal device allocates the resources to each candidate logical channel in the second set of candidate logical channels, which is similar to the process in which the terminal device allocates the resources to each candidate logical channel in the first set of candidate logical channels, can be understood with reference to records in the above-mentioned S701 and will not be repeated herein.

The implementation mode of the implementation shown in FIG. 7 will be described specifically below through an example.

Figure 8:
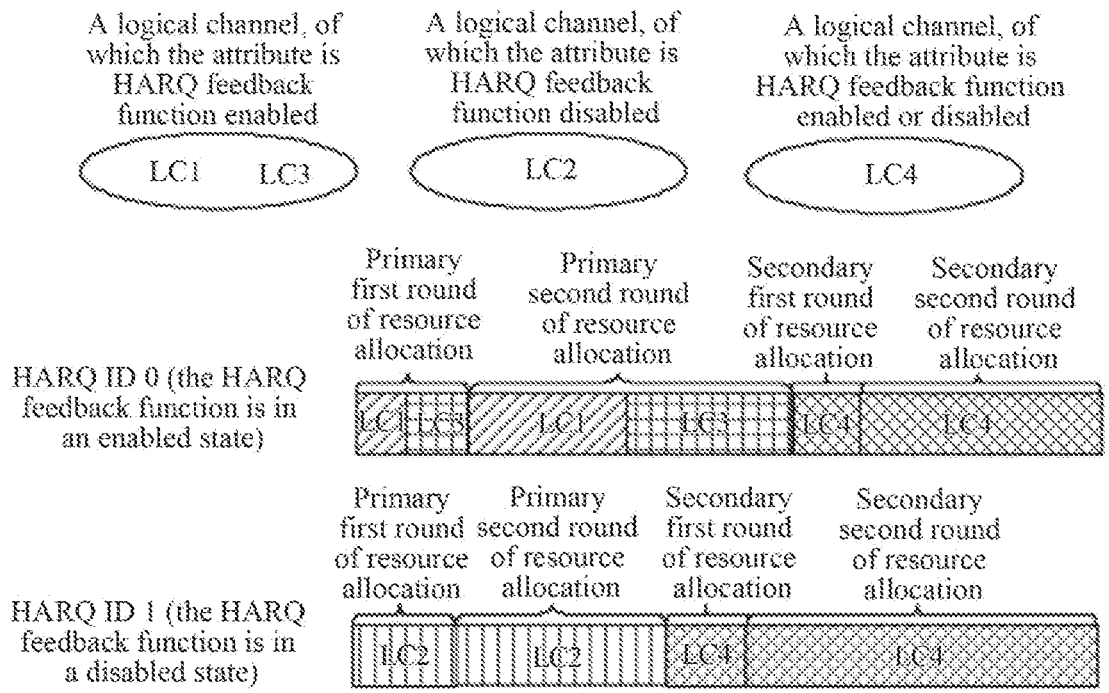
FIG. 8 is a schematic diagram of HARQ feedback function attributes of logical channels that a terminal device has and still another resource allocation of each logical channel.

Exemplarily, FIG. 8 is a schematic diagram of HARQ feedback function attributes of logical channels that a terminal device has and still another resource allocation of each logical channel. Referring to FIG. 8, it is assumed that the terminal device has established four uplink logical channels in total, LC1, LC2, LC3 and LC4, respectively. The specific acts for the terminal device to perform logical channel selection and resource allocation are as follows.

(81) The terminal device receives RRC configuration information transmitted by the network device.

The specific implementation of (81), which is consistent with the specific implementation of (41) in the schematic diagram corresponding to FIG. 4, can be understood with reference to records in the schematic diagram shown in FIG. 4 and will not be repeated herein.

The logical channel priority of each logical channel that the terminal device has is LC1>LC2>LC3>LC4, the attributes of LC1 and LC3 are HARQ feedback function enabled, the attribute of LC2 is HARQ feedback function disabled, and the attribute of LC4 is HARQ feedback function enabled/disabled. The terminal device has two uplink HARQ process numbers, HARQ ID 0 and HARQ ID 1 respectively, and the HARQ feedback function of HARQ ID 0 is in the enabled state, and the HARQ feedback function of HARQ ID 1 is in the disabled state.

As an example, (82) the terminal device receives the first information transmitted by the network device, the first information including the uplink transmission resources and HARQ ID 0 of the HARQ process used for transmitting data on the uplink transmission resources. Since the HARQ feedback function of HARQ ID 0 is in the enabled state, the terminal device completes multiplexing of the logical channels according to the following acts.

(82.1) LC1 and LC3 are selected as the first set of candidate logical channels in this uplink transmission, and LC4 is selected as the second set of candidate logical channels in this uplink transmission.

(82.2) The primary first round of resource allocation and the primary second round of resource allocation are performed, i.e., the terminal device allocates the resources satisfying the PBR to LC1 and LC3 (the primary first round of resource allocation), and updates the numbers of tokens in PBR token buckets corresponding to LC1 and LC3 according to the resource allocation result; if there are still remaining uplink transmission resources after the primary first round of resource allocation is performed, the terminal device sequentially allocates the remaining uplink transmission resources to LC1 and LC3 in an order of logical channel priority from high to low (the primary second round of resource allocation) regardless of the size of Bj of LC1 or LC3.

(82.3) The secondary first round of resource allocation and the secondary second round of resource allocation are performed, i.e., if there are still remaining uplink transmission resources after the terminal device performs respectively the primary first round of resource allocation and the primary second round of resource allocation for LC1 and LC3, the terminal device allocates the resources, i.e., the resources satisfying the PBR, to LC4 (the secondary first round of resource allocation), and updates the number of tokens in the PBR token bucket corresponding to LC4 according to the resource allocation result; if there are still remaining uplink transmission resources after the secondary first round of resource allocation is performed, the terminal device allocates the remaining uplink transmission resources to LC4 (the secondary second round of resource allocation) regardless of the size of Bj of LC4.

As another example, (83) the terminal device receives the first information transmitted by the network device, the first information including the uplink transmission resources and HARQ ID 1 of the HARQ process used for transmitting data on the uplink transmission resources, since the HARQ feedback function of HARQ ID 1 is in the disabled state, the terminal device completes multiplexing of the logical channels according to the following acts.

(83.1) LC2 is selected as the first set of candidate logical channels in this uplink transmission, and LC4 is selected as the second set of candidate logical channels in this uplink transmission.

(83.2) The primary first round of resource allocation and the primary second round of resource allocation are performed, i.e., the terminal device allocates the resources satisfying the PBR to LC2 (the primary first round of resource allocation), and updates the number of tokens in a PBR token bucket corresponding to LC2 according to the resource allocation result; and if there are still remaining uplink transmission resources after the primary first round of resource allocation is performed, the terminal device allocates the remaining uplink transmission resources to LC2 regardless of the size of Bj of LC2.

(83.3) The secondary first round of resource allocation and the secondary second round of resource allocation are performed, i.e., the terminal device allocates the resources satisfying the PBR to LC4, and updates the number of tokens in a PBR token bucket corresponding to LC4 according to the resource allocation result; and if there are still remaining uplink transmission resources after the secondary first round of resource allocation is performed, the terminal device allocates the remaining uplink transmission resources to LC4 regardless of the size of LC4.

In a method for channel processing in accordance with an implementation of the present disclosure, the terminal device first performs the primary first round of resource allocation and the primary second round of resource allocation for each candidate logical channel in the first set of candidate logical channels using the uplink transmission resources, secondly, if the uplink transmission resources are not fully allocated after the primary first round of resource allocation and the primary second round of resource allocation are performed, the terminal device determines the remaining uplink transmission resources, and finally performs sequentially the secondary first round of resource allocation and the secondary second round of resource allocation for each candidate logical channel in the second set of candidate logical channels using the remaining uplink transmission resources. In this technical solution, the terminal device first multiplexes the first set of candidate logical channels to the maximum extent, and then multiplexes the second set of candidate logical channels, so that data transmission of the logical channels with consistent attributes can be guaranteed preferentially to the maximum extent, thereby meeting the different QoS requirements of various services to the maximum extent.

To sum up, the terminal device can configure the attribute of whether the HARQ function is enabled/disabled in each HARQ process based on the HARQ process in the NTN. An implementation of the present disclosure provides a method in which in the NTN, the terminal device performs logical channel prioritization according to the uplink transmission resources allocated by the network device, so as to implement multiplexing of the uplink logical channels. Different QoS requirements of various services can be well met by using this method, improving the service experience of users.

The specific implementation mode of the methods for channel processing mentioned in the implementations of the present disclosure is described above, and apparatus implementations of the present disclosure described below can be used for performing the method implementations of the present disclosure. Details not disclosed in the apparatus implementations of the present disclosure will be understood with reference to the method implementations of the present disclosure.

Figure 9:
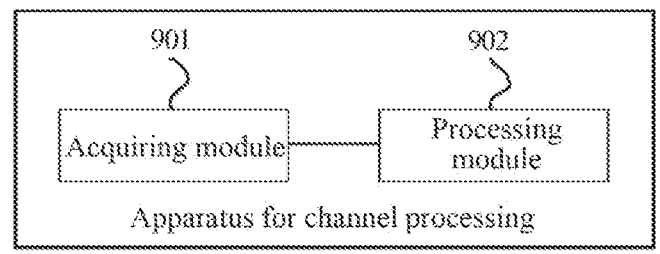
FIG. 9 is a schematic structure diagram of a first implementation of an apparatus for channel processing in accordance with the present disclosure.

FIG. 9 is a schematic structure diagram of a first implementation of an apparatus for channel processing in accordance with the present disclosure. The apparatus can be integrated in or implemented by a terminal device. As shown in FIG. 9, the apparatus may include an acquiring module 901 and a processing module 902.

The acquiring module 901 is configured to acquire first information, the first information including uplink transmission resources and an identifier of an HARQ process used for transmitting data on the uplink transmission resources.

The processing module 902 is configured to determine a set of candidate logical channels multiplexed on the uplink transmission resources according to an HARQ feedback function state of the HARQ process and an HARQ feedback function attribute of each logical channel.

In one possible design of the present disclosure, the acquiring module 901 is further configured to acquire configuration information transmitted by a network device before acquiring the first information, the configuration information including first configuration information for each uplink logical channel of the terminal device and second configuration information for uplink HARQ processes.

The first configuration information includes a logical channel priority, a prioritized bit rate, a token bucket size duration, and an HARQ feedback function attribute.

The second configuration information includes the number of uplink HARQ processes and an HARQ feedback function state of each HARQ process.

Optionally, the HARQ feedback function attribute is one of the following attributes: HARQ feedback function enabled, HARQ feedback function disabled, and HARQ feedback function enabled or disabled.

In another possible design of the present disclosure, the processing module 902 is further configured to allocate resources to each candidate logical channel according to the first configuration information for each candidate logical channel in the set of candidate logical channels.

As an example, the set of candidate logical channels includes a logical channel, of which the HARQ feedback function attribute is consistent and/or partially consistent with the HARQ feedback function state of the HARQ process, among all logical channels in which there is currently data to be transmitted.

Optionally, if the HARQ feedback function state of the HARQ process is an enabled state, the set of candidate logical channels includes: a logical channel, of which the HARQ feedback function attribute is HARQ feedback function enabled, and a logical channel, of which the HARQ feedback function attribute is HARQ feedback function enabled or disabled, among all logical channels in which there is currently data to be transmitted.

Optionally, if the HARQ feedback function state of the HARQ process is a disabled state, the set of candidate logical channels includes: a logical channel, of which the HARQ feedback function attribute is HARQ feedback function disabled, and a logical channel, of which the HARQ feedback function attribute is HARQ feedback function enabled or disabled, among all logical channels in which there is currently data to be transmitted.

As another example, the processing module 902 is configured to allocate the resources to each candidate logical channel according to the first configuration information for each candidate logical channel in the set of candidate logical channels, specifically including:

the processing module 902 is specifically configured to allocate the resources to each candidate logical channel according to the prioritized bit rate, the logical channel priority, and the token bucket size duration of each candidate logical channel in the set of candidate logical channels.

In still another possible design of the present disclosure, the set of candidate logical channels includes a first set of candidate logical channels and a second set of candidate logical channels.

The first set of candidate logical channels includes a logical channel, of which the HARQ feedback function attribute is consistent with the HARQ feedback function state of the HARQ process, among all logical channels in which there is currently data to be transmitted.

The second set of candidate logical channels includes a logical channel, of which the HARQ feedback function attribute is HARQ feedback function enabled or disabled, among all logical channels in which there is currently data to be transmitted.

Optionally, if the HARQ feedback function state of the HARQ process is the enabled state, the first set of candidate logical channels includes a logical channel, of which the HARQ feedback function attribute is HARQ feedback function enabled, among all logical channels in which there is currently data to be transmitted.

Optionally, if the HARQ feedback function state of the HARQ process is the disabled state, the first set of candidate logical channels includes a logical channel, of which the HARQ feedback function attribute is HARQ feedback function disabled, among all logical channels in which there is currently data to be transmitted.

In yet another possible design of the present disclosure, the processing module 902 is configured to allocate the resources to each candidate logical channel according to the first configuration information for each candidate logical channel in the set of candidate logical channels, specifically including:

the processing module 902 is specifically configured to perform a first round of resource allocation for each candidate logical channel in the first set of candidate logical channels and the second set of candidate logical channels respectively using the uplink transmission resources, if the uplink transmission resources are not fully allocated after the first round of resource allocation is performed, determine remaining uplink transmission resources, and perform a second round of resource allocation for each candidate logical channel in the first set of candidate logical channels and the second set of candidate logical channels respectively using the remaining uplink transmission resources.

Exemplarily, the processing module 902 is configured to perform the first round of resource allocation for each candidate logical channel in the first set of candidate logical channels and the second set of candidate logical channels respectively using the uplink transmission resources, specifically including:

the processing module 902 is specifically configured to perform a primary first round of resource allocation for each candidate logical channel in the first set of candidate logical channels using the uplink transmission resources according to the prioritized bit rate, the logical channel priority, and the token bucket size duration of each candidate logical channel in the first set of candidate logical channels, if the uplink transmission resources are not fully allocated after the primary first round of resource allocation is performed, determine first uplink remaining transmission resources, and perform a secondary first round of resource allocation for each candidate logical channel in the second set of candidate logical channels according to the prioritized bit rate, the logical channel priority, and the token bucket size duration of each candidate logical channel in the second set of candidate logical channels using the first uplink remaining transmission resources.

Optionally, the remaining uplink transmission resources are second uplink remaining transmission resources.

The processing module 902 is configured to perform the second round of resource allocation for each candidate logical channel in the first set of candidate logical channels and the second set of candidate logical channels respectively using the remaining uplink transmission resources, specifically including:

the processing module 902 is specifically configured to perform sequentially a primary second round of resource allocation for each candidate logical channel in the first set of candidate logical channels in an order of logical channel priority from high to low using the second uplink remaining transmission resources, if the second uplink remaining transmission resources are not fully allocated after the primary second round of resource allocation is performed, determine third uplink remaining transmission resources, and perform sequentially a secondary second round of resource allocation for each candidate logical channel in the second set of candidate logical channels in an order of logical channel priority from high to low using the third uplink remaining transmission resources.

In still another possible design of the present disclosure, the processing module 902 is configured to allocate the resources to each candidate logical channel according to the first configuration information for each candidate logical channel in the set of candidate logical channels, specifically including:

the processing module 902 is specifically configured to perform the primary first round of resource allocation and the primary second round of resource allocation for each candidate logical channel in the first set of candidate logical channels using the uplink transmission resources, if the uplink transmission resources are not fully allocated after the primary first round of resource allocation and the primary second round of resource allocation are performed, determine the remaining uplink transmission resources, and perform sequentially the secondary first round of resource allocation and the secondary second round of resource allocation for each candidate logical channel in the second set of candidate logical channels using the remaining uplink transmission resources.

Optionally, the processing module 902 is configured to perform the primary first round of resource allocation and the primary second round of resource allocation for each candidate logical channel in the first set of candidate logical channels using the uplink transmission resources, specifically including:

the processing module 902 is specifically configured to perform the primary first round of resource allocation for each candidate logical channel in the first set of candidate logical channels using the uplink transmission resources according to the prioritized bit rate, the logical channel priority, and the token bucket size duration of each candidate logical channel in the first set of candidate logical channels, if the uplink transmission resources are not fully allocated after the primary first round of resource allocation is performed, determine fourth uplink remaining transmission resources, and perform sequentially the primary second round of resource allocation for each candidate logical channel in the first set of candidate logical channels in an order of logical channel priority from high to low using the fourth uplink remaining transmission resources.

Exemplarily, the remaining uplink transmission resources are fifth uplink remaining transmission resources.

The processing module 902 is configured to perform sequentially the secondary first round of resource allocation and the secondary second round of resource allocation for each candidate logical channel in the second set of candidate logical channels using the remaining uplink transmission resources, specifically including:

the processing module 902 is specifically configured to perform the secondary first round of resource allocation for each candidate logical channel in the second set of candidate logical channels using the fifth uplink remaining transmission resources according to the prioritized bit rate, the logical channel priority, and the token bucket size duration of each candidate logical channel in the second set of candidate logical channels, if the fifth uplink remaining transmission resources are not fully allocated after the secondary second round of resource allocation is performed, determine sixth uplink remaining transmission resources, and perform sequentially the secondary second round of resource allocation for each candidate logical channel in the second set of candidate logical channels in an order of logical channel priority from high to low using the sixth uplink remaining transmission resources.

The apparatus provided by this implementation is used for performing the technical solutions of the terminal device side in the implementations shown in FIGS. 2 to 7, implementation principles and technical effects thereof are similar and will not be repeated herein.

Figure 10:
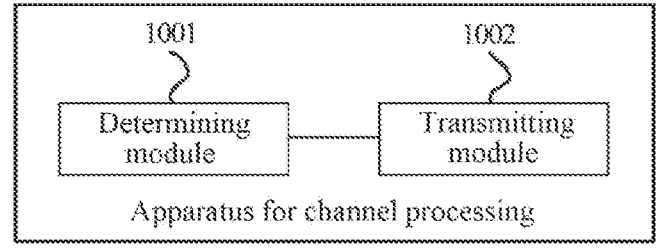
FIG. 10 is a schematic structure diagram of a second implementation of an apparatus for channel processing in accordance with the present disclosure.

FIG. 10 is a schematic structure diagram of a second implementation of an apparatus for channel processing in accordance with the present disclosure. The apparatus can be integrated in or implemented by a network device. As shown in FIG. 10, the apparatus may include a determining module 1001 and a transmitting module 1002.

The determining module 1001 is configured to determine configuration information for a terminal device, the configuration information including first configuration information for each uplink logical channel and second configuration information for uplink HARQ processes.

The transmitting module 1001 is configured to transmit the configuration information to a terminal device.

The first configuration information includes a logical channel priority, a prioritized bit rate, a token bucket size duration, and an HARQ feedback function attribute.

The second configuration information includes the number of uplink HARQ processes and an HARQ feedback function state of each HARQ process.

Optionally, the HARQ feedback function attribute is one of the following attributes: HARQ feedback function enabled, HARQ feedback function disabled, and HARQ feedback function enabled or disabled.

Implementation principles and technical effects of the apparatus provided by this implementation, which is used for performing the technical solutions of the network device side in the implementations shown in FIGS. 2 to 7, are similar and will not be repeated herein.

It should be noted that it should be understood that the division of various modules of the apparatus described above is only a logical function division. The modules can be fully or partially integrated into one physical entity or physically separated in the actual implementation. All the modules can be implemented by invoking software through a processing element; or all the modules can be implemented in the form of hardware; or some of the modules can be implemented by invoking software through the processing element, and the other modules can be implemented in the form of hardware. For example, the processing module or the determining module can be a separately established processing element, or can be integrated in a certain chip of the apparatus, or can be stored in a memory of the apparatus in the form of a program code. Functions of the determining module can be invoked and executed by a certain processing element of the apparatus. The implementation of other modules is similar. In addition, all or part of these modules can be integrated together or implemented independently. The processing element described herein can be an integrated circuit having a signal processing capability. In an implementation process, all acts of the methods described above or various modules described above can be accomplished by integrated logic circuits of hardware in the processing element or instructions in the form of software.

For example, the modules described above can be one or more integrated circuits, such as one or more application specific integrated circuits (ASICs), or one or more microprocessors (DSPs), or one or more field programmable gate arrays (FPGAs), etc., which are configured to implement the methods described above. As another example, when a certain module described above is implemented by scheduling program codes through a processing element, which may be a general purpose processor, such as a central processing unit (CPU) or another processor that can invoke the program codes. As another example, these modules can be integrated together and implemented in the form of system-on-chip (SOC).

The above-mentioned implementations can be implemented in whole or in part through software, hardware, firmware, or any combination thereof. When implemented through software, they can be implemented in whole or in part in the form of a computer program product. The computer program product includes one or more computer instructions. When the computer program instructions are loaded to and executed on a computer, the processes or functions described according to the implementations of the present disclosure will be generated in whole or in part. The computer may be a general purpose computer, a special purpose computer, a computer network or another programmable apparatus. The computer instructions can be stored in a computer-readable storage medium or transmitted from one computer-readable storage medium to another computer-readable storage medium, for example, the computer instructions can be transmitted from one website site, computer, server or data center to another website site, computer, server or data center in a wired (e.g., coaxial cable, optical fiber, digital subscriber line (DSL)) or wireless (e.g., infrared, wireless, microwave and the like) manner. The computer-readable storage medium may be any available medium which the computer can access to, or a data storage device such as a server or data center having one or more available media integrated therein. The available medium may be a magnetic medium (e.g., floppy disk, hard disk, magnetic tape), an optical medium (e.g., DVD), or a semiconductor medium (e.g., solid state disk (SSD)).

Figure 11:
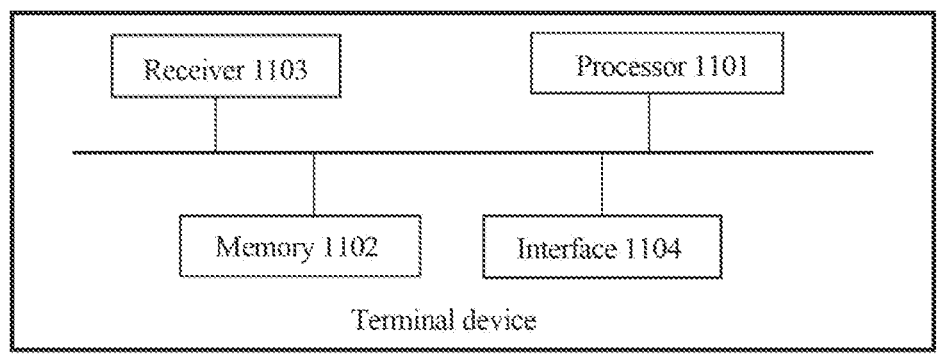
FIG. 11 is a schematic structure diagram of an implementation of a terminal device in accordance with the present disclosure.

FIG. 11 is a schematic structure diagram of an implementation of a terminal device in accordance with the present disclosure. As shown in FIG. 11, the terminal device may include a processor 1101, a memory 1102, a receiver 1103, and an interface 1104 for communicating with a network device.

The memory 1102 is used for storing computer executable instructions; the receiver 1103 is used for communicating with other devices via the interface 1104, and the processor 1101 executes the computer executable instructions stored in the memory 1102, so that the processor 1101 performs the technical solutions of the terminal device side in the aforementioned implementations shown in FIGS. 2 to 7.

Figure 12:
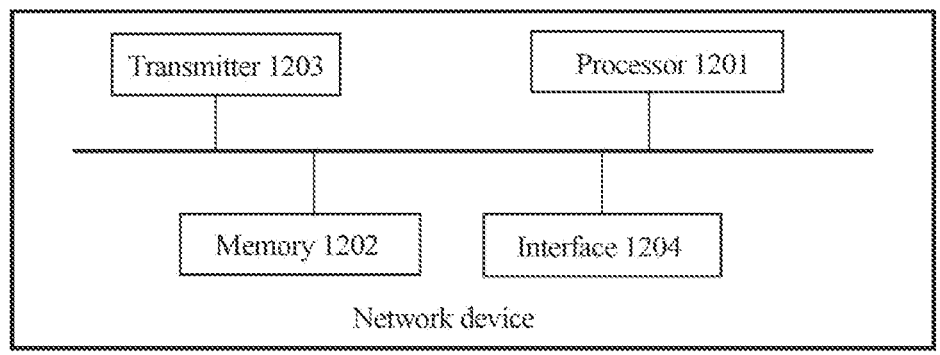
FIG. 12 is a schematic structure diagram of an implementation of a network device in accordance with the present disclosure.

FIG. 12 is a schematic structure diagram of an implementation of a network device in accordance with the present disclosure. As shown in FIG. 12, the network device may include a processor 1201, a memory 1202, a transmitter 1203, and an interface 1204 for communicating with a terminal device.

The memory 1202 is used for storing computer executable instructions; the transmitter 1203 is used for communicating with other devices via the interface 1204, and the processor 1201 executes the computer executable instructions stored in the memory 1202, so that the processor 1201 performs the technical solutions of the network device side in the aforementioned implementations shown in FIGS. 2 to 7.

Further, the present disclosure also provides a communication system, which includes a network device and a terminal device. The terminal device may be the channel processing apparatus shown in FIG. 9 or the terminal device shown in FIG. 11, and the network device may be the channel processing apparatus shown in FIG. 10 or the network device shown in FIG. 12. The specific implementation of the terminal device and the network device can be understood with reference with records in the above implementations and will not be repeated herein.

The present disclosure further provides a computer-readable storage medium having computer executable instructions stored thereon, which, when executed by a processor, are used for implementing the technical solutions of the terminal device side in any one of the method implementations described above.

The present disclosure further provides a computer-readable storage medium having computer executable instructions stored thereon, which, when executed by a processor, are used for implementing the technical solutions of the network device side in any one of the method implementations described above.

An implementation of the present disclosure further provides a program, which, when executed by a processor, is used for performing the technical solutions of the terminal device side in any one of the method implementations described above.

An implementation of the present disclosure further provides a program, which, when executed by a processor, is used for performing the technical solutions of the network device (base station) side in any one of the method implementations described above.

An implementation of the present disclosure further provides a computer program product including program instructions, which are used for implementing the technical solutions of the terminal device side in any one of the method implementations described above.

An implementation of the present disclosure further provides a computer program product including program instructions, which are used for implementing the technical solutions of the network device (base station) side in any one of the method implementations described above.

An implementation of the present disclosure further provides a chip including a processing module capable of performing the technical solutions of the terminal device side in any one of the method implementations described above and a communication interface.

Further, the chip also includes a storage module (e.g., a memory) used for storing instructions, the processing module is used for executing the instructions stored in the storage module, and the execution of the instructions stored in the storage module causes the processing module to perform the technical solutions of the terminal device side in any one of the method implementations described above.

An implementation of the present disclosure further provides a chip including a processing module capable of performing the technical solutions of the network device (base station) side in any one of the method implementations described above and a communication interface.

Further, the chip also includes a storage module (e.g., a memory) used for storing instructions, the processing module is used for executing the instructions stored in the storage module, and the execution of the instructions stored in the storage module causes the processing module to perform the technical solutions of the network device side in any one of the method implementations described above.

In several implementations in accordance with the present disclosure, it should be understood that the disclosed system, apparatus, and method may be implemented in other ways. For example, the apparatus implementations described above are only illustrative. For example, the division of the units is only a logical function division, and other division manners may be possible in the actual implementation. For example, multiple units or components may be combined or integrated into another system, or some features may be ignored or not executed. In addition, coupling or direct coupling or communication connection shown or discussed between each other, which may be indirect coupling or communication connection between the devices or units via some interfaces, may be electrical, mechanical, or in other forms.

In the specific implementation of the above-mentioned user equipment and network device, it should be understood that the processor may be a central processing unit (CPU), or another general purpose processor such as a digital signal processor (DSP), an application specific integrated circuit (ASIC), and the like. The general purpose processor may be a microprocessor or the processor may be any conventional processor. The acts of the methods disclosed in conjunction with the implementations of the present disclosure may be directly embodied to be completed by a hardware processor or by a combination of hardware and software modules in the processor.

All or part of the acts of implementing the method implementations described above may be completed by program instruction related hardware. The aforementioned program can be stored in a readable memory. The program, when executed, performs the acts of the method implementations described above. The aforementioned memory (storage medium) includes a read-only memory (ROM), a RAM, a flash memory, a hard disk, a solid state disk, a magnetic tape, a floppy disk, an optical disk and any combination thereof.

The invention claimed is:

1. A method for channel processing, comprising:
acquiring first information, wherein the first information comprises uplink transmission resources and an identifier of an HARQ process used for transmitting data on the uplink transmission resources; and
determining a set of candidate logical channels multiplexed on the uplink transmission resources according to an HARQ feedback function state of the HARQ process and an HARQ feedback function attribute of each logical channel;
wherein the HARQ feedback function state of the HARQ process comprises: HARQ feedback enabled, or HARQ feedback disabled;
the HARQ feedback function attribute of each logical channel comprises: HARQ feedback enabled, or HARQ feedback disabled;
wherein the set of candidate logical channels comprises a logical channel, of which the HARQ feedback function attribute is consistent with the HARQ feedback function state of the HARQ process, among all logical channels in which there is currently data to be transmitted.

2. The method of claim 1, wherein before acquiring the first information, the method further comprises:
acquiring configuration information transmitted by a network device, wherein the configuration information comprises first configuration information for each uplink logical channel of the terminal device and second configuration information for uplink HARQ processes;
wherein the first configuration information comprises a logical channel priority, a prioritized bit rate, a token bucket size duration, and an HARQ feedback function attribute; and
the second configuration information comprises a number of uplink HARQ processes and an HARQ feedback function state of each HARQ process.

3. The method of claim 1, further comprising:
allocating resources to each candidate logical channel according to first configuration information for each candidate logical channel in the set of candidate logical channels.

4. The method of claim 1, wherein if the HARQ feedback function state of the HARQ process is an enabled state, the set of candidate logical channels comprises: a logical channel, of which the HARQ feedback function attribute is HARQ feedback enabled, and a logical channel, of which the HARQ feedback function attribute is HARQ feedback enabled or disabled, among all logical channels in which there is currently data to be transmitted.

5. The method of claim 1, wherein if the HARQ feedback function state of the HARQ process is a disabled state, the set of candidate logical channels comprises: a logical channel, of which the HARQ feedback function attribute is HARQ feedback disabled, and a logical channel, of which the HARQ feedback function attribute is HARQ feedback enabled or disabled, among all logical channels in which there is currently data to be transmitted.

6. The method of claim 3, wherein allocating the resources to each candidate logical channel according to the first configuration information for each candidate logical channel in the set of candidate logical channels comprises:
allocating the resources to each candidate logical channel according to a prioritized bit rate, a logical channel priority, and a token bucket size duration of each candidate logical channel in the set of candidate logical channels.

7. A method for channel processing, comprising:
determining configuration information for a terminal device, wherein the configuration information comprises first configuration information for each uplink logical channel and second configuration information for uplink HARQ processes; and
transmitting the configuration information to the terminal device,
wherein the first configuration information comprises a logical channel priority, a prioritized bit rate, a token bucket size duration, and an HARQ feedback function attribute; and
the second configuration information comprises a number of uplink HARQ processes and an HARQ feedback function state of each HARQ process;
wherein the HARQ feedback function attribute of each uplink logical channel comprises: HARQ feedback enabled, or HARQ feedback disabled;
wherein the HARQ feedback function state of the HARQ process comprises: HARQ feedback enabled, or HARQ feedback disabled.

8. An apparatus for channel processing, comprising a processor and a receiver; wherein
the receiver is configured to receive first information, wherein the first information comprises uplink transmission resources and an identifier of an HARQ process used for transmitting data on the uplink transmission resources; and
the processor is configured to determine a set of candidate logical channels multiplexed on the uplink transmission resources according to an HARQ feedback function state of the HARQ process and an HARQ feedback function attribute of each logical channel;
wherein the HARQ feedback function state of the HARQ process comprises: HARQ feedback enabled, or HARQ feedback disabled;
the HARQ feedback function attribute of each logical channel comprises: HARQ feedback enabled, or HARQ feedback disabled;
wherein the set of candidate logical channels comprises a logical channel, of which the HARQ feedback function attribute is consistent with the HARQ feedback function state of the HARQ process, among all logical channels in which there is currently data to be transmitted.

9. The apparatus of claim 8, wherein the receiver is further configured to receive configuration information transmitted by a network device before receiving the first information, wherein the configuration information comprises first configuration information for each uplink logical channel of the terminal device and second configuration information for uplink HARQ processes;
wherein the first configuration information comprises a logical channel priority, a prioritized bit rate, a token bucket size duration, and an HARQ feedback function attribute; and
the second configuration information comprises a number of uplink HARQ processes and an HARQ feedback function state of each HARQ process.

10. The apparatus of claim 8, wherein the processor is further configured to allocate resources to each candidate logical channel according to first configuration information for each candidate logical channel in the set of candidate logical channels.

11. The apparatus of claim 8, wherein if the HARQ feedback function state of the HARQ process is an enabled state, the set of candidate logical channels comprises: a logical channel, of which the HARQ feedback function attribute is HARQ feedback enabled, and a logical channel, of which the HARQ feedback function attribute is HARQ feedback enabled or disabled, among all logical channels in which there is currently data to be transmitted.

12. The apparatus of claim 8, wherein if the HARQ feedback function state of the HARQ process is a disabled state, the set of candidate logical channels comprises: a logical channel, of which the HARQ feedback function attribute is HARQ feedback disabled, and a logical channel, of which the HARQ feedback function attributes are HARQ feedback enabled or disabled, among all logical channels in which there is currently data to be transmitted.

13. The apparatus of claim 10, wherein the processor is configured to allocate the resources to each candidate logical channel according to the first configuration information for each candidate logical channel in the set of candidate logical channels, specifically comprising:

the processor is specifically configured to allocate the resources to each candidate logical channel according to a prioritized bit rate, a logical channel priority, and a token bucket size duration of each candidate logical channel in the set of candidate logical channels.

14. An apparatus for channel processing, comprising a processor and a transmitter;

the processor is configured to determine configuration information for a terminal device, wherein the configuration information comprises first configuration information for each uplink logical channel and second configuration information for uplink HARQ processes; and the transmitter is configured to transmit the configuration information to a terminal device, wherein the first configuration information comprises a logical channel priority, a prioritized bit rate, a token bucket size duration, and an HARQ feedback function attribute; and the second configuration information comprises a number of uplink HARQ processes and an HARQ feedback function state of each HARQ process;

wherein the HARQ feedback function attribute of each uplink logical channel comprises: HARQ feedback enabled, or HARQ feedback disabled;

wherein the HARQ feedback function state of the HARQ process comprises: HARQ feedback enabled, or HARQ feedback disabled.

\* \* \* \* \*